(12) United States Patent
Oka

(10) Patent No.: US 8,416,369 B2
(45) Date of Patent: Apr. 9, 2013

(54) POLARIZER PROTECTIVE FILM, POLARIZING PLATE AND VA MODE LIQUID CRYSTAL DISPLAY

(75) Inventor: Shigeki Oka, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 673 days.

(21) Appl. No.: 11/681,919

(22) Filed: Mar. 5, 2007

(65) Prior Publication Data

US 2007/0222920 A1 Sep. 27, 2007

(30) Foreign Application Priority Data

Mar. 9, 2006 (JP) ................................ 2006-063915

(51) Int. Cl.
*G02F 1/1335* (2006.01)
*C09K 19/00* (2006.01)

(52) U.S. Cl. ......... 349/96; 349/117; 428/1.31; 428/1.33

(58) Field of Classification Search ............... 349/96, 349/117; 428/1.31, 500, 507, 520, 1.33
See application file for complete search history.

(56) References Cited

U.S. PATENT DOCUMENTS

| | | | | |
|---|---|---|---|---|
| 6,881,454 | B2 * | 4/2005 | Taguchi | 428/1.1 |
| 6,897,303 | B2 * | 5/2005 | Yamada | 536/58 |
| 7,471,360 | B2 * | 12/2008 | Murakami et al. | 349/117 |
| 2002/0082375 | A1 * | 6/2002 | Andrist et al. | 526/317.1 |
| 2002/0102369 | A1 | 8/2002 | Shimizu et al. | |
| 2003/0190491 | A1 * | 10/2003 | Jones et al. | 428/500 |
| 2004/0175407 | A1 * | 9/2004 | McDaniel | 424/423 |
| 2004/0235700 | A1 * | 11/2004 | Legrand et al. | 510/302 |
| 2006/0045992 | A1 | 3/2006 | Michihata | |
| 2006/0188667 | A1 * | 8/2006 | Watanabe et al. | 428/1.33 |
| 2007/0195226 | A1 * | 8/2007 | Aminaka et al. | 349/96 |

FOREIGN PATENT DOCUMENTS

| | | |
|---|---|---|
| CN | 1646952 | 7/2005 |
| JP | 2000017024 A * | 1/2000 |
| JP | 2001-072799 | 3/2001 |
| JP | 2003-012859 | 1/2003 |
| JP | 2003012859 A * | 1/2003 |
| JP | 2004-001330 | 1/2004 |
| JP | 2005139304 * | 6/2005 |
| JP | 2006-036840 | 2/2006 |
| TW | 1235174 | 5/1991 |
| WO | 2005114272 | 12/2005 |

OTHER PUBLICATIONS

Chinese Office Action, pp. 1-5 and and English language translation thereof, pp. 1-7.
Japanese Office Action Mailing No. 081472 (3 pages) and English language translation thereof (5 pages).
Taiwan Office Action Mailing Date Dec. 6, 2012.
English Translation of Taiwan Office Action Mailing Date Dec. 6, 2012.

* cited by examiner

*Primary Examiner* — Hoan C Nguyen
(74) *Attorney, Agent, or Firm* — Lucas & Mercanti, LLP

(57) ABSTRACT

A polarizer protective film containing a cellulose acylate having a total acyl substitution degree of from 2.2 to less than 2.5 and a polymer prepared by polymerizing an acrylate ester or a methacrylate ester.

8 Claims, 1 Drawing Sheet

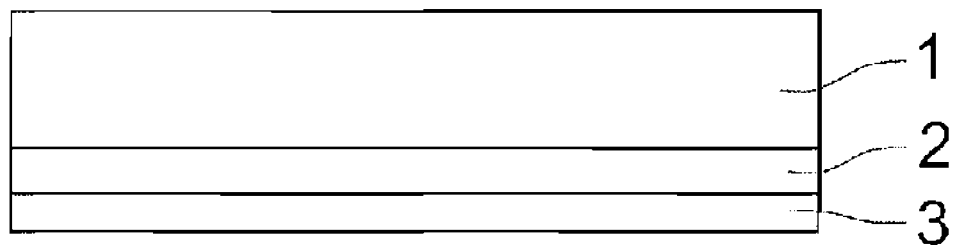

POLARIZER PROTECTIVE FILM, POLARIZING PLATE AND VA MODE LIQUID CRYSTAL DISPLAY

This application is based on Japanese Patent Application No. 2006-063915 filed on Mar. 9, 2006 in Japanese Patent Office, the entire content of which is hereby incorporated by reference.

FIELD OF THE INVENTION

The present invention relates to a polarizer protective film, polarizing plate and a vertical alignment mode liquid crystal display, and, in more detail, relates to a polarizer protective film exhibiting an excellent viewing angle property and reduced light leakage in the black display portion which may cause corner unevenness (also referred to as "corner mura") or whitish screen problem, when used as a retardation film, and to a polarizing plate and a vertical alignment mode liquid crystal display employing the polarizer protective film.

BACKGROUND OF THE INVENTION

Varieties of films have been offered so far in order to enlarge a viewing angle of a liquid crystal display. As a film to enlarge a viewing angle, there have been offered a polarizing plate prepared by adhered a retardation film on a surface of a common polarizing plate of a liquid crystal display, a polarizing plate in which a liquid crystal layer is provided on the polarizer protective film of the polarizing plate or a polarizing plate employing a polarizer protective film having a retardation function, in order to enlarge the viewing angle.

A cellulose triacetate (triacetyl cellulose, TAC) film has been conventionally used for a polarizer protective film of a liquid crystal display. TAC film exhibits high transparency, excellent adhesiveness to a polyvinyl alcohol film which is used as a polarizer and smaller birefringent anisotropy. Accordingly, TAC film has been suitably used as a polarizer protective film, since it gives no undesired retardation effect to a polarizing plate. However, on the contrary, TAC film has been thought to be unsuitable for such a purpose that expansion of viewing angle was attempted by providing a retardation effect to a polarizing plate itself, since, although TAC film has some extent of positive birefringency, it is difficult for a TAC film to have a sufficient retardation effect by stretching the film, due to its too small anisotropy. After that, there developed has been a technique using a material in which retardation effect was provided by changing the acetyl substituent of triacetyl cellulose (for example, refer to Patent Document 1) or a technique in which a film having larger retardation effect was prepared by adding a material providing a retardation effect (for example, refer to Patent Document 2). These techniques have already been commercialized. Thus, it has become possible to provide a retardation effect to a polarizer protective film itself, by suitably stretching a cellulose ester film provided with anisotropy. Specifically, expansion of viewing angle of a VA (vertical alignment) mode liquid crystal display has become possible.

However, thus prepared polarizing plate having a different retardation effect from that of the commonly used TAC film also has the following problems as well as the conventional TAC film. When a polarizing plate laminated of a glass substrate of a liquid crystal display is kept under a higher temperature condition, the polyvinyl alcohol film as a polarizer may shrink and give a stress to the polarizer protective film, resulting in changing the retardation effect of the polarizer protective film. Thus, there may occur a leakage of light in the black image portion of the screen, namely, a frame unevenness (also referred to as "corner mura") which occurs at peripheral areas near the four sides of a TN (twisted nematic) mode liquid crystal display or a corner unevenness which occurs at the four corners of a VA mode or a IPS (in-plane switching) mode liquid crystal display. Also, a phenomenon in which whole the screen seems whitish (whitish screen problem) may occur, which is due to property changes occurring in the polyvinyl alcohol and TAC caused by the applied heat and humidity.

On the other hand, a cellulose acylate film exhibits optical anisotropy, although it is small. The small optical birefringency of the cellulose acylate film may give an undesired effect on the viewing angle property or color hue of a liquid crystal display. As a method to reduce the optical anisotropy, there disclosed has been a technique to add a material which compensates the anisotropy, namely, a material having negative birefringency, for example, acryl polymer (for example, refer to Patent Document 3) or a styrene polymer (for example, refer to Patent Document 4), in order to control the retardation effect.

Patent Document 1 JP-A No. 2001-188128 (hereinafter, JP-A refers to Japanese Patent Application Publication Open to Public Inspection
Patent Document 2 JP-A No. 2000-111914
Patent Document 3 JP-A No. 2003-12859
Patent Document 4 JP-A No. 2005-105140

SUMMARY OF THE INVENTION

An object of the present invention is to provide a polarizer protective film exhibiting an excellent viewing angle property and reduced light leakage in the black display portion which may cause corner unevenness or whitish screen problem, when used as a retardation film, and to provide a polarizing plate and a vertical alignment mode liquid crystal display employing the polarizer protective film.

One of the aspects of the present invention to achieve the above abject is a polarizer protective film containing a cellulose acylate having a total acyl substitution degree of from 2.2 to less than 2.5 and a polymer prepared by polymerizing an acrylate ester or a methacrylate ester.

BRIEF DESCRIPTION OF THE DRAWING

FIG. 1 is a schematic illustration of a polarizer protective film containing an antistatic layer and an adhesive layer.

DESCRIPTION OF THE PREFERRED EMBODIMENTS

The above object of the present invention is achieved by the following structures.

(1) A polarizer protective film containing a cellulose acylate having a total acyl substitution degree of from 2.2 to less than 2.5 and a polymer prepared by polymerizing an acrylate ester or a methacrylate ester.
(2) The polarizer protective film of Item (1), wherein a weight average molecular weight of the polymer prepared by polymerizing an acrylate ester or a methacrylate ester is 500 to 30000.
(3) The polarizer protective film of Item (1), wherein the polarizer protective film is a retardation film.
(4) The polarizer protective film of Item (1), wherein an in-plane retardation value Ro is 0 to 100 nm and a retardation value in a thickness direction of the film Rth is 40 to 250 nm, $$Ro = (nx - ny) \times d$$

$$Rth = \{(nx + ny)/2 - nz\} \times d$$

wherein, nx is a refractive index in a slow axis direction in a film plane, ny is a refractive index in a fast axis direction in the film plane, nz is a refractive index in a thickness direction of the film and d is a thickness of the film (nm).

(5) A polarizing plate having the polarizer protective film of Item (1) used as a polarizer protective film facing a liquid crystal cell.

(6) A vertical alignment mode liquid crystal display having the polarizing plate of Item (5).

According to the present invention, a polarizer protective film exhibiting an excellent viewing angle property and reduced light leakage in the black display portion which may cause corner unevenness or whitish screen problem, when used as a retardation film, and a polarizing plate and a vertical alignment mode liquid crystal display employing the polarizer protective film can be provided.

The best modes to carry out the present invention will now be described in detail, however, the present invention is not limited thereto.

In the present invention, it was found that a polarizer protective film exhibiting an excellent viewing angle property and reduced light leakage in the black display portion, which may cause corner unevenness or whitish screen problem, when used as a retardation film, and a polarizing plate and a vertical alignment mode liquid crystal display employing the polarizer protective film can be provided by using a polarizer protective film in a polarizing plate as a retardation film, the polarizer protective film containing a cellulose acylate having a total acyl substitution degree of 2.2 or more and less than 2.5 and a polymer obtained by polymerizing an acrylate ester or a methacrylate ester.

As described above, a TAC film has been used as a film which protect a polarizer, since it exhibits small birefringency, however, due to its small anisotropic property, a TAC film cannot be used, as it is, as a retardation film exhibiting an optical compensation effect. Accordingly, a technique to use a cellulose acetate propionate (Patent Document 1) and a technique to use an additive to control the birefringency (Patent Document 2) have been developed. On the other hand, although anisotropy of a TAC film is small, it still exists. Accordingly, in order to reduce the anisotropy, a technique to utilize an acrylate polymer (Patent Document 3) and a technique to utilize a styrene polymer (Patent Document 4) have been disclosed.

As a result of examining the problem on light leakage in the black display portion which may cause corner unevenness or whitish screen problem, the present inventor has found that the above problems could be overcome by combining a technique to use a cellulose acylate having a low total acyl substitution degree and a technique to use an acrylate polymer, and, thus, the present invention has been completed. It was also found that the problem on light leakage in the black display portion which may cause corner unevenness or whitish screen problem has not been fully overcome, when a styrene polymer is used in combination with a cellulose acylate having a low total acyl substitution degree, and that the above described effect was a specific effect when an acrylate polymer is used.

In general, the retardation values of a triacetyl cellulose film are as follows: a retardation value in the thickness direction of the film, Rth is 30-60 nm and an in-plane retardation value Ro is 5 nm or less, provided that the retardation values are measured under a condition of 23° C. and 55% RH at a wavelength of 589 nm. A film in which the retardation value in the thickness direction is further decreased has also been disclosed. The polarizer protective film also having a function of a retardation film of the present invention means a film having the Rth value of more than 60 nm which is so called a negative C plate film or a biaxial film, while the above described polarizer protective film exhibits the Rth value of 60 nm or less.

The present invention will now be explained in more detail.

(Cellulose Acylate)

The polarizer protective film of the present invention is characterized in that the polarizer protective film is a cellulose acylate film containing a cellulose acylate having a total acyl substitution degree of 2.2 or more but less than 2.5. (Hereafter, the polarizer protective film of the present invention is also referred to as a cellulose acylate film).

A cellulose molecule contains many glucose units connected each other and each glucose unit has three hydroxyl groups. The substitution degree denotes the number of acyl group which substitutes the three hydroxyl groups. For example, in the case of cellulose triacetate, acetyl groups are connected to all of the three hydroxyl groups.

The cellulose acylate employed in the present invention is a carboxylate ester having 2-22 carbon atoms, which may be an aromatic carboxylate ester, and, specifically, a lower fatty acid ester of cellulose is preferable. The lower fatty acid used in the lower fatty acid ester of cellulose denotes a fatty acid having not more than 6 carbon atoms. The acyl group connected to the hydroxyl group may have a straight chain or a branched chain or may form a ring. The acyl group may further be substituted with a substituent. When the acyl substitution degree is the same, a larger number of carbon atoms contained in an acyl group results in lowered birefringency of the cellulose acylate film. Accordingly, the acyl group is preferably selected from the acyl groups having 2-6 carbon atoms. The above number of carbon atoms as a cellulose acylate is preferably 2-4 and more preferably 2-3.

Preferable examples of a cellulose acylate include: cellulose acetate, cellulose propionate, cellulose butyrate and mixed fatty acid esters, for example, disclosed in JP-A Nos. 10-45804 and 8-231761 and U.S. Pat. No. 2,319,052, such as cellulose acetate propionate, cellulose acetate butyrate, and cellulose acetate phthalate.

Specifically, the polarizer protective film of the present invention preferably contains a cellulose acetate propionate having a total acyl substitution degree of 2.2 or more but less than 2.5 and a propionyl substitution degree of 0.7-1.5. These cellulose acetate propionates can be synthesized according to a method known in the art.

The substitution degree of acetyl group can be measured according to the method prescribed in ASTM-D817-96.

The cellulose as a raw material of the cellulose acylate of the present invention is not specifically limited, however, includes such as cotton linter, wood pulp (derived from an acicular tree, and a broard-leaved tree) and kenaf. Further, cellulose acylates prepared from them can be utilized by mixing at an arbitrary ratio, respectively. These cellulose acylates can be prepared, when an acylation agent is acid anhydride (such as acetic acid anhydride, propionic acid anhydride and butyric acid anhydride), by utilizing an organic solvent such as organic acid like acetic acid or methylene chloride and reacting said acylation agent with a cellulose raw material by use of a proton catalyst such as sulfuric acid.

In the case of an acylation agent being acid chloride (such as $CH_3COCl$, $C_2H_5COCl$ and $C_3H_7COCl$), the reaction is performed employing a basic compound such as amine as a catalyst. Specifically, the cellulose ester can be synthesized with reference to such as a method described in JP-A 10-45804.

A larger molecular weight of a cellulose acylate film results in increase of elastic modulus, however, too large molecular weight lowers the productivity of the cellulose ester film, since the viscosity of the melted cellulose acylate becomes too large. The number average molecular weight (Mn) of the cellulose acylate is preferably 40000-200000 and more preferably 100000-200000. The Mw/Mn value of the cellulose acylate of the present invention is preferably 4.0 or less and more preferably 1.4-2.3.

The average molecular weight and the molecular weight distribution of the cellulose acylate can be measured by using a high performance liquid chromatography, whereby number average molecular weight (Mn) and weight average molecular weight (Mw) can be determined and their ratio can be calculated.

The measuring conditions are as follows.
Solvent: Methylene chloride
Column: Shodex K806, K805 and K803G, each manufactured by Showa Denko Co., Ltd., are connected for use.
Column temperature: 25° C.
Sample concentration: 0.1% by weight
Detector: RI Model 504 manufactured by GL Science Co., Ltd.
Pump: L6000 manufactured by Hitachi Seisakusho Co., Ltd.
Flowing amount: 1.0 ml/min.
Calibration Curve: A calibration curve prepared by using 13 kinds of standard polystyrene samples having Mw of from 1,000,000 to 500, STK Standard Polystyrene manufactured by Toso Co., Ltd., was used. The differences of the Mw between each of the 13 standard samples are each preferably approximately equal.

The cellulose ester preferably shows the following properties, namely, when 1 g of the cellulose acylate is dissolved in 20 ml of pure water (electrical conductivity of not more than 0.1 μS/cm and pH of 6.8) and stirred for 1 hr under a nitrogen atmosphere, the solution exhibits pH of 6-8 and electrical conductivity of 1-100 μS/cm.

(Polymer Obtained by Polymerizing Acrylate Ester or Methacrylate Ester)

The polarizer protective film of the present invention is characterized in that it contains a polymer obtained by polymerizing an acrylate ester or a methacrylate ester. The polymer obtained by polymerizing an acrylate ester or a methacrylate ester of the present invention may be composed of a single monomer or a plurality of monomers. The monomer is preferably selected from an acrylate monomer or a methacrylate monomer, however, depending on the retardation property, the wavelength dispersion, or the heat resistance of the producing film, other monomer, for example, maleic anhydride, styrene may be contained suitably.

Hereafter, the polymer obtained by polymerizing an acrylate ester or a methacrylate ester is designated as polymer X and will be explained below.

<Polymer X>

Polymer X of the present invention is preferably a polymer obtained by copolymerizing Xa which is an ethylenically unsaturated monomer having neither an aromatic ring nor a hydrophilic group in the molecule and Xb which is an ethylenically unsaturated monomer having no aromatic ring but having a hydrophilic group in the molecule. Polymer X preferably has a weight average molecular weight of 500-30000, and preferably represented by Formula (1). Further, polymer X is preferably a solid at a temperature of 30° C. or less, or the glass transition temperature of polymer X is preferably 35° C. or more.

When the weight average molecular weight is 500 or more, the problem of corner unevenness is largely improved, and when the weight average molecular weight is 30000 or less, excellent transparency and excellent compatibility with the cellulose acylate can be obtained.

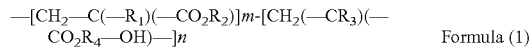

$$-[CH_2-C(-R_1)(-CO_2R_2)]m-[CH_2(-CR_3)(-CO_2R_4-OH)-]n \quad \text{Formula (1)}$$

(in the formula, $R_1$ and $R_3$ each represent H or $CH_3$, $R_2$ represents an alkyl group having 2-12 carbon atoms or a cycloalkyl group, $R_4$ represents $-CH_2-$, $-C_2H_4-$, or $-C_3H_6-$, m and n each represent a molar ratio, and m+n=100).

Examples of a monomer as a monomer unit constituting polymer X of the present invention will be listed below, however, the present invention is not limited thereto.

Examples of ethylenically unsaturated monomer Xa incorporating neither an aromatic ring nor a hydrophilic group in the molecule include: methyl acrylate, ethyl acrylate, propyl (i- or n-) acrylate, butyl (n-, i-, s-, or t-) acrylate, pentyl (n-, i-, or s-) acrylate, hexyl (n- or i-) acrylate, heptyl (n- or i-) acrylate, octyl (n- or i-) acrylate, nonyl (n- or i-) acrylate, myristyl (n- or i-) acrylate, 2-ethylhexyl acrylate, E-caprolactone acrylate, 2-hydroxyethyl acrylate, and 2-ethoxyethyl acrylate, and those in which the above acrylate esters are converted to methacrylate esters. Of these, preferred are methyl acrylate, ethyl acrylate, methyl methacrylate, ethyl methacrylate, and propyl (i- or n-) methacrylate.

Preferred as ethylenically unsaturated monomer Xb incorporating no aromatic ring but incorporating a hydrophilic group in the molecule are acrylic or methacrylic acid esters as a monomer unit incorporating a hydroxyl group. Examples include 2-hydroxyethyl acrylate, 2-hydroxypropyl acrylate, 3-hydroxypropyl acrylate, 4-hydroxybutyl acrylate, and 2-hydroxybutyl acrylate, as well as those in which the above acrylate esters are converted to methacrylate esters. Of these, preferable are 2-hydroxyethyl acrylate, 2-hydroxyethyl methacrylate, 2-hydroxypropyl acrylate and 3-hydroxypropyl acrylate.

In the present invention, polymer X is prepared via copolymerization of hydrophobic monomer Xa and hydrophilic monomer Xb.

The ratio of use of hydrophobic monomer Xa hydrophilic monomer Xb during synthesis is preferably in the range of 99:1-65:35, but is more preferably in the range of 95:5-75:25. When the ratio of Hydrophobic Monomer Xa increases, compatibility with cellulose acylate is enhanced while retardation value Rth in the film thickness direction increases. When the ratio of Hydrophilic Monomer Xb is increased, the compatibility with cellulose ester is reduced, however, the effect to lower Rt is enhanced. Also, the ratio of Hydrophilic Monomer Xb exceeding the above range is not preferable, since haze may occur in the film formation process.

In order to synthesize such polymers, it is preferable to employ a method which does not excessively increase the molecular weight, but results as much as possible in uniform molecular weight since it is difficult to control the molecular weight employing a common polymerization method. Examples of such methods include a method in which peroxide polymerization initiators such as cumene peroxide or t-butylhydroperoxide are employed; a method in which polymerization initiators in a larger amount than the common polymerization is employed; a method in which other than polymerization initiators, chain transfer agents such as a mercapto compound or carbon tetrachloride are employed; a method in which other than polymerization initiators, polymerization terminating agents such as benzoquinone or dinitrobenzene are employed; and a method in which block polymerization is performed employing polymerization catalysts employing compounds incorporating one thiol group and a secondary hydroxyl group, or incorporating the above compound and organic metal compounds, described in JP-A Nos. 2000-128911 and 2000-344823. Any of these methods can be preferably applied in the present invention.

It is possible to control the weight average molecular weight of polymer X of the present invention, employing conventional molecular weight controlling methods. Listed as one of such method is incorporating chain transfer agents such as carbon tetrachloride, lauryl mercaptan, or octyl thioglycolate. The polymerization temperature is commonly room temperature to 130° C., but is preferably 50 to 100° C. It is also possible to control the weight average molecular weight by controlling the above temperature or the polymerization reaction time.

It is possible to determine the weight average molecule weight employing the above mentioned method.

The adding amount of polymer X is adjusted to provide a desired retardation value to the film. A larger amount of polymer X is used to decrease the retardation value, and a smaller amount of polymer X is used to increase the retardation value. However, if it is too small, corner unevenness may occur, and if it is too large, the film strength may not be maintained. Accordingly, the adding amount is preferably 5-45% by weight.

<Additives>

Various additives may be used in the polarizer protective film of the present invention in a range where the effect of the present invention is not disturbed. Examples of such an additive include: a plasticizer which provides workability, flexibility or moisture resistance to the film, a UV absorber which provides a UV absorbing property to the film, an antioxidant which prevents deterioration of the film, particles (matting agent) which provides lubricity to the film and a retardation control agent which adjusts the retardation value of the film.

(Plasticizer)

The plasticizer used in the present invention is nor specifically limited, however, it is preferable that the plasticizer contains a functional group which can be interact with cellulose ester, for example, via a hydrogen bond, in order not to cause haze in the film nor to cause bleeding out or volatilization from the film.

Examples of such a functional group include: a hydroxyl group, an ether group, a carbonyl group, an ester group, carboxylic acid residue, an amino group, an imino group, an amido group, an imino group, a cyano group, a nitro group, a sulfonyl group, sulfonic acid residue, a phosphnyl group and phosphonic acid residue. Of these, a carbonyl group, an ester group and a phosphonyl group are preferable.

Phosphate ester plasticizer: Specific examples of the phosphate ester plasticizer include phosphoric acid alkyl esters such as triacetyl phosphate and tributyl phosphate; phosphoric acid cycloalkyl esters such as tricyclopentyl phosphate and cyclohexyl phosphate; and phosphoric acid aryl esters such as triphenyl phosphate, tricresyl phosphate, cresylphenyl phosphate, octyldiphenyl phosphate, diphenylbiphenyl phosphate, trioctyl phosphate, tributyl phosphate, trinaphtyl phosphate, trixylyl phosphate, trisortho-biphenyl phosphate. The substituent groups for these may be the same or different, and may be further substituted. The substituent groups may be a mixture of an alkyl group, a cycloalkyl group and an aryl group, and the substituent groups may be bonded to each other via covalent bond.

Examples of the phosphoric acid ester also include phosphate esters, for example: alkylenebis(dialkylphosphate) such as ethylenebis(dimethylphosphate) or butylenebis(diethylphosphate); alkylenebis(diarylphosphate) such as ethylenebis(diphenylphosphate) or propylenebis(dinaphtylphosphate); arylenebis(dialkylphosphate) such as phenylenebis (dibutylphosphate) or biphenylenebis(dioctylphosphate); and arylenebis(diarylphosphates) such as phenylenebis (diphenylphosphate) or naphtylenebis(ditriylphosphate). These substituent groups may be the same or different, and may be further substituted. The substituent groups may be a mixture of an alkyl group, cycloalkyl groups and aryl groups, and the substituent groups may be bonded to each other via covalent bond.

Furthermore, a part of the structure of the phosphate ester may be a part of the polymer or may be systematically included as a pendant. It may also be introduced into a part of the molecular structure of the additive such as the antioxidant, the acid scavenger, the ultraviolet light absorber. Of the compounds listed above, aryl phosphate ester and arylenebis(diarylphosphate) are preferable, and more specifically, triphenyl phosphate and phenylenebis(diphenylphosphate) are preferable.

Ethylene glycol ester plasticizer: Specific examples of an ethylene glycol ester plasticizer include: ethylene glycol alkyl ester additives such as ethylene glycol diacetate and ethylene glycol dibutyrate; ethylene glycol cycloalkyl ester additives such as ethylene glycol dicyclopropyl carboxylate and ethylene glycol dicyclohexyl carboxylate; and ethylene glycol aryl ester additives such as ethylene glycol dibenzoate and ethylene glycol di-4-methyl benzoate. These alkylate groups, cycloalkylate groups and arylate groups may be the same or different and may further be substituted. The substituent groups may be a mixture of alkylate groups, cycloalkylate groups and arylate groups, and the substituent groups may be bonded to each other via covalent linkage. Further, the ethylene glycol portions may be substituted and the ethylene glycol ester part of the structure may be part of the polymer or may be systematically included as a pendant. It may also be introduced into a part of the molecular structure of the additives such as an antioxidant, an acid scavenger, and an ultraviolet light absorber.

Glycerin ester plasticizers: Examples of a glycerin ester plasticizer include: glycerin alky esters such as triacetin, tributylin, glycerin diacetate caprylate and glycerin oleate propionate; glycerin cycloalkyl esters such as glycerin tricyclopropyl carboxylate, and glycerin tricyclohexyl carboxylate; glycerin aryl esters such as glycerin tribenzoate and glycerin 4-methylbenzoate; diglycerin alkyl esters such as diglycerin tetraacetylate, diglycerin tetrapropionate, digylcerin acetate tricaprylate and diglycerin tetralaurate; diglycerin cycloalkyl esters such as diglycerin tetracylobutyl carboxylate and diglycerin tetracylopentyl carboxylate; and diglycerin aryl esters such as diglycerin tetrabenzoate and diglycerin 3-methyl benzoate. These alkylate groups, cycloalkyl carboxylate groups and arylate groups may be same or different and may further be substituted. The substituent groups may be a mixture of an alkylate group, a cycloalky carboxylate group and an arylate groups, and the substituent groups may be bonded to each other via covalent bond. Further, the glycerin and diglycerin portions may be substituted and a partial structure of the glycerin ester or diglycerin ester may be a part of the polymer or may be systematically included as a pendant. It may also be introduced into a part of the molecular structure of the additive such as an antioxidant, an acid scavenger, and an ultraviolet light absorber.

Polyalcohol ester plasticizers: Specific examples of polyalcohol ester plasticizers include the polyalcohol ester plasticizers disclosed in JP-A 2003-12823, paragraphs 30-33.

These alkylate groups, cycloalkyl carboxylate groups and arylate groups may be the same or different and may be further be substituted. The alkylate groups, cycloalky carboxylate groups and arylate groups may be mixed, and the substituent groups may be bonded to each other via covalent bond. Furthermore, the polyhydric alcohol portion may be substituted and a partial structure of the polyhydric alcohol may be a part of the polymer or may be systematically included as a pendant. It may also be introduced into a part of the molecular structure of the additives such as an antioxidant, an acid scavenger or an ultraviolet light absorber.

Dicarboxylic acid ester plasticizer: Specific examples of a dicarboxylic acid ester plasticizer include: alkyl dicarboxylic acid cycloalkyl ester additives such as didodecyl malonate (C1), dioctyl adipate (C4) and dibutyl cebacate (C8); alkyl dicarboxylic acid cycloalkyl ester additives such as dicyclopentyl succinate and dicyclohexyl adipate; alkyl dicarboxylic acid aryl ester additives such as diphenyl succinate and di-4-methyl phenyl glutarate; cycloalkyl dicarboxylic acid alkyl ester additives such as dihexyl-1,4-cyclohexane dicarboxylate and didecyl bicycle [2.2.1]heptane-2,3-dicarboxylate; cycloalkyl dicarboxylic acid cycloalkyl ester additives such as dicyclohexyl-1,2-cyclobutane dicarboxylate and dicyclopropyl-1,2-cyclohexyl dicarboxylate; cycloalkyl dicarboxylic acid aryl ester additives such as diphenyl-1,1-cyclopropyl dicarboxylate and di-2-naphthyl-1,4-cyclohexane dicarboxylate; aryl dicarboxylic acid alkyl ester additives such as diethyl phthalate, dimethyl phthalate, dioctyl phthalate, dibutyl phthalate and di-2-ethylhexyl phthalate; aryl dicarboxylic acid cycloalkyl ester additives such as dicyclopropyl phthalate and dicyclohexyl phthalate; and aryl dicarboxylic acid aryl ester additives such as diphenyl phthalate and di-4-methylphenyl phthalate. These alkoxy groups and cycloalkoxy groups may be the same or different, and may also be mono-substituted and the substitution groups may be further substituted. The alkyl groups and the cycloalkyl groups may be mixed, and the substituent groups may be bonded to each other via covalent bond. Furthermore, the aromatic ring of the phthalic acid may be substituted and may be a multimer such as a dimer, a trimer or a tetramer. The phthalic acid ester part of the structure may be a part of the polymer or may be systematically included as a pendant. It may also be introduced into a part of the molecular structure of the additives such as an antioxidant, an acid scavenger and an ultraviolet light absorber.

The adding amount of these plasticizers can be in the range of 1-25% by weight. When the adding amount is less than 1% by weight, the effect of the plasticizer cannot be obtained. The adding amount of more than 25% by weight is not preferable because bleeding out tends to occur, resulting in deterioration of long term stability of the polarizer protective film. The adding amount of these plasticizers is preferably less than the adding amount of polymer X.

(UV Absorber)

The polarizer protective film or other films used for a liquid crystal display contain a UV absorber which prevents deterioration of the liquid crystals or the polarizer when a liquid crystal display is used in outdoor. Also, in the present invention, a UV absorber is preferably used. Examples of a UV absorber usable in the present invention include: oxybenzophenone, benzotriazole, salicylate ester, benzophenone, cyanoacrylate, triazine and a nickel complex. Of these, preferable compounds include benzotriazole because of little coloring. Examples of preferably usable UV absorber include: TINUVIN 109, TINUVIN 171, TINUVIN 326, TINUVIN 327 and TINUVIN 328 produced by Ciba Specialty Chemicals Inc. Since a low molecular weight UV absorber tends to deposit on the web or evaporate while the film is produced, like a plasticizer, the content is preferably 1-10% by weight.

In the present invention, a polymer UV absorber is preferably incorporated in the cellulose ester film since the polymer UV absorber is more difficult to deposit than the above mentioned low molecular weight UV absorber, whereby UV rays are thoroughly blocked without losing dimensional stability, retention of the UV absorber, anti-permeability, while preventing phase separation of the UV absorber in the film. As a polymer UV absorber usable in the present invention, the polymer UV absorbers disclosed in JP-A No. 6-148430 and polymers containing a UV absorbing monomer can be used without limitation.

It is preferable in the present invention that a UV absorbing copolymer (also referred to as a polymer UV absorber) obtained from a UV absorbing monomer represented by Formula (2) is incorporated in the cellulose ester film.

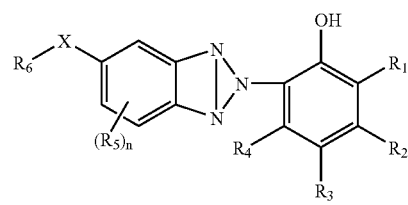

Formula (2)

(in the formula, n represents an integer of 0-3, $R_1$-$R_5$ each represent a hydrogen atom, a halogen atom or a substituent, X represents —COO—, CONR$_7$—, —OCO— or —NR$_7$CO—, $R_6$ and $R_7$ each represent a hydrogen atom, an alkyl group or an aryl group, provided that the group represented by $R_6$ contains a polymerizable group as a substructure)

In Formula (2), n represents an integer of 0-3, and when n is 2 or more, plural $R_5$ may be the same or different to each other and may be combined to form a 5-7 membered ring.

$R_1$-$R_5$ each represent a hydrogen atom, a halogen atom or a substituent. Examples of a halogen atom include: a fluorine atom, a chlorine atom, a bromine atom and an iodine atom. Of these, preferable is a fluorine atom or a chlorine atom. Examples of a substituent include: alkyl groups (for example, a methyl group, an ethyl group, an isopropyl group, a hydroxyethyl group, a methoxymethyl group, a trifluoromethyl group and a t-butyl group), alkenyl groups (for example, a vinyl group, an allyl group and a 3-butene-1-yl group), aryl groups (for example, a phenyl group, a naphthyl group, a p-tolyl group and a p-chlorophenyl group), heterocycle groups (for example, a pyridyl group, a benzimidazolyl group, a benzthiazolyl group and a benzoxazolyl group), alkoxy groups (for example, a methoxy group, an ethoxy group, an isopropoxy group and a n-butoxy group), aryloxy groups, (for example, a phenoxy group), heterocycleoxy groups (for example, a 1-phenyltetrazole-5-oxy group and a 2-tetrahydropyranyloxy group), acyloxy groups (for example, an acetoxy group, a pivaloyloxy group and a benzoylexy group), acyl groups (for example, an acetyl group, a propanoyl group and a butyroyl group), alkoxycarbonyl groups (for example, a methoxycarbonyl group and an ethoxycarbonyl group), aryloxycarbonyl groups (for example, a phenoxycarbonyl group), carbamoyl groups (for example, a methylcarbamoyl group, an ethylcarbamoyl group and a dimethylcarbamoyl group), amino groups, alkylamino groups (for example, a methylamino group, an ethylamino group and a diethylamino group), anilino groups (for example, an anilino group and a N-methylanilino group), acylamino groups (for example, an acetylamino group and a propionylamino group), a hydroxyl group, cyano groups, nitro groups, sulfonamide groups (for example, a methanesulfonamide group and a benzenesulfonamide group), sulfamoylamino groups (for example, a dimethylsulfamoylamino group), sulfonyl groups (for example, a methanesulfonyl group, a butanesulfonyl group and a phenylsulfonyl group), sulfamoyl groups (for example, an ethylsulfamoyl group and a dimethylsulfamoyl group), sulfonylamino groups (for example, a methanesulfonylamino group and a benzenesulfonylamino group), ureido groups (for example, a 3-methylureido group, a 3,3-dimethylureido group and a 1,3-dimethylureido group), imide groups (for example, a phthalimide group), silyl groups (for example, a trimethylsilyl group, a triethylsilyl group and a t-butyldimethylsilyl group), alkylthio groups (for example, a methylthio group, an ethylthio group and an n-butylthio group), and arylthio groups (for example, a phenylthio group). Of these, preferable are, for example, alkyl groups and an aryl groups.

In Formula (2), the groups represented by $R_1$-$R_5$ each may be further substituted, if possible and neighboring groups of $R_1$-$R_4$ may be combined to form a 5-7 membered ring.

$R_6$ represents a hydrogen atom, an alkyl group, a cycloalkyl group, an alkenyl group or an alkynyl group. Examples of an alkyl group include: a methyl group, an ethyl group, a propyl group, an isopropyl group, an n-butyl group, an isobutyl group, a t-butyl group, an amyl group, an isoamyl group and a hexyl group. The above alkyl groups may further have a halogen atom or a substituent. Examples of a halogen atom include: a fluorine atom, a chlorine atom, a bromine atom and an iodine atom. Examples of a substituent include: acyl groups (for example, an acetyl group, a propanoyl group and a butyroyl group), alkoxy groups (for example, a methoxy group, an ethoxy group, an isopropoxy group and a n-butoxy group), amino groups, alkylamino groups (for example, a methylamino group, an ethylamino group and a diethylamino group), acylamino groups (for example, an acetylamino group and a propionylamino group), a hydroxyl group, cyano groups, carbamoyl groups (for example, a methylcarbamoyl group, an ethylcarbamoyl group and a dimethylcarbamoyl group), acyloxy groups (for example, an acetoxy group and a pivaloyloxy group) and alkoxycarbonyl groups (for example, a methoxycarbonyl group and an ethoxycarbonyl group).

Examples of a cycloalkyl group include: saturated cyclohydrocarbon groups such as a cyclopentyl group, a cyclohexyl group, a norbornyl group and an adamantyl group, which may be further substituted or may not be substituted.

Examples of an alkenyl group include: a vinyl group, an allyl group, 1-methyl-2-propenyl group, a 3-butenyl group, a 3-methyl-2 butenyl group and an oleyl group. Of these, preferable are a vinyl group or a 1-methyl-2-propenyl group.

Examples of an alkynyl group include: an ethynyl group, a butadiyl group, a propargyl group, a 1-methyl-2-propynyl group, a 2-butyny group, a 1,1-dimethyl-2-propynyl group. Of these, preferable are, for example, an ethynyl group and a propargyl group.

In Formula (2), X represents —COO—, CONR$_7$—, —OCO— or —NR$_7$CO—.

$R_7$ represents a hydrogen atom, an alkyl group and a cycloalkyl group. Examples of an alkyl group include: a methyl group, an ethyl group, a propyl group, an isopropyl group, a n-butyl group, an isobutyl group, a t-butyl group, an amyl group, an isoamyl group and a hexyl group. Each of these alkyl groups may further have a halogen atom or a substituent. Examples of a halogen atom include: a fluorine atom, a chlorine atom, a bromine atom and an iodine atom. Examples of a substituent include: acyl groups (for example, an acetyl group, a propanoyl group and a butyroyl group), alkoxy groups (for example, a methoxy group, an ethoxy group, an isopropoxy group and a n-butoxy group), amino groups, alkylamino groups (for example, a methylamino group, an ethylamino group and a diethylamino group), aniline groups (for example, an aniline group and an N-methyl aniline group), acylamino groups (for example, an acetylamino group and a propionylamino group), a hydroxyl group, cyano groups, carbamoyl groups (for example, a methylcarbamoyl group, an ethylcarbamoyl group and a dimethylcarbamoyl group), acyloxy groups (for example, an acetoxy group and a pivaloyloxy group) and alkoxycarbonyl groups (for example, a methoxycarbonyl group and an ethoxycarbonyl group).

Examples of a cycloalkyl group include saturated cyclic hydrocarbons, such as a cyclopentyl group, a cyclohexyl group, a norbornyl group, and an adamantyl group, which may be further substituted or may not be substituted.

In the present invention, the polymerizable group includes an unsaturated ethylenic polymerizable group or a bifunctional condensation-polymerizable group, and preferably an unsaturated ethylenic polymerizable group. Concrete examples of the unsaturated ethylenic polymerizable group include a vinyl group, an allyl group, an acryloyl group, a methacryloyl group, a styryl group, an acrylamido group, a methacrylamido group, a vinyl cyanide group, a 2-cyanoacryloxy group, a 1,2-epoxy group and a vinyl ether group and preferably the vinyl group, the acryloyl group, the methacryloyl group, the acrylamido group and the methacrylamido group. To have a polymerizable group as a substructure means that the polymerizable groups are bonded directly or through a linking group of divalent or more. Examples of a linking group of divalent or more include: alkylene groups (such as a methylene group, a 1,2-ethylene group, a 1,3-propylene group, a 1,4-butylene group and a cyclohexane-1, 4-diyl group); alkenylene groups (such as an ethene-1,2-diyl group and a butadiene-1,4-diyl group); alkynylene groups (such as an ethyne-1,2-diyl group, a butane-1,3-diyl-1,4-diyl); and hetero atom linking groups (an oxygen atom, a sulfur atom, a nitrogen atom, a silicon atom and a phosphor atom). Of these, preferable are, for example, an alkylene group and a hetero atom linking group. These groups may be combined to form a composite bonding group. The weight average molecular weight of the polymer derived from the UV absorbing monomer is 2,000-30,000, and preferably 5,000-20,000.

The weight average molecular weight of the UV absorbing copolymer can be controlled by known molecular weight controlling methods. For controlling the molecular weight, for example, a method can be applied in which a chain transfer agent such as carbon terachloride, laurylmercptane or octyl thioglycolate is employed. The polymerization is usually performed at a temperature of from a room temperature to 130° C., and preferably 50-100° C.

The UV absorbing polymer employed in the present invention may be a homopolymer derived from a UV absorbing monomer or may be a copolymer derived from the UV absorbing monomer and another polymerizable monomer. Examples of the other monomer capable of polymerizing include unsaturated compounds, for example, styrene derivatives (such as styrene, α-methylstyrene, o-methylstyrene, m-methylstyrene, p-methylstyrene and vinylnephthalene); acrylate derivatives (such as methyl acrylate, ethyl acrylate, propyl acrylate, butyl acrylate, i-butyl acrylate, t-butyl acrylate, octyl acrylate, cyclohexyl acrylate and benzyl acrylate); methacrylate derivatives (such as methyl methacrylate, ethyl methacrylate, propyl methacrylate, butyl methacrylate, i-butyl methacrylate, t-butyl methacrylate, octyl methacrylate and cyclohexyl methacrylate); alkyl vinyl ethers (such as methyl vinyl ether, ethyl vinyl ether and butyl vinyl ether); alkyl vinyl esters (such as vinyl formate, vinyl acetate, vinyl butyrate, vinyl capronate and vinyl stearate); crotonic acid; maleic acid; fumaric acid; itaconic acid; acrylonitrile; methacrylonitrile; vinyl chloride; vinylidene chloride; acrylamide; and methacrylamide. Of these, for example, methyl acrylate, methyl methacrylate and vinyl acetate are preferred.

It is also preferable that the component other than the UV absorbing monomer in the polymer derived from the UV absorbing monomer contains a hydrophilic ethylenically unsaturated monomer.

As the hydrophilic ethylenically unsaturated monomer, a hydrophilic compound having a polymerizable unsaturated double bond in the molecular thereof is employable without any limitation. For example, a unsaturated carboxylic acid such as acrylic acid and methacrylic acid, an acrylate and methacrylate each having a hydroxyl group or an ether bond such as 2-hydroxyethyl methaceylate, 2-hydroxypropyl methacrylate, tetrahydrfurfuryl methacrylate, 2-hydroxyethyl acrylate, 2-ydroxypropyl acrylate, 2,3-dihydroxy-2-methylpropyl methacrylate, tetrahydrofurfuryl acrylate, 2-ethoxyethyl acrylate, diethylene glycol ethoxylate acrylate and 3-methoxybutylbutyl acrylate, acrylamide, an N-substituted (meth)acrylamido such as N,N-dimethyl(meth)acrylate, N-vinylpyrrolidone and N-vinyloxazolidone are employable.

As the hydrophilic ethylenically unsaturated monomer, a (meth)acrylate having a hydroxyl group or a carboxyl group in the molecule thereof is preferable, and 2-hydroxyethyl methacrylate, 2-hydroxypropyl methacrylate, 2-hydroxyethyl acrylate and 2-hydroxypropyl acrylate are particularly preferable.

These polymerizable monomers can be copolymerized solely or in combination of two or more kinds together with the UV absorbing monomer.

In the present invention, the method for polymerizing the UV absorbing copolymer is not specifically limited and known methods such as radical polymerization, anion polymerization and cation polymerization can be widely applied. As the initiator for the radical polymerization, an azo compound and a peroxide compound such as azobisisobutylnitrile (AIBN), a diester of azobisisobutylic acid, benzoyl peroxide and hydrogen peroxide are employable. The solvent for polymerization is not specifically limited, and examples of usable solvent include an aromatic hydrocarbon type solvent such as toluene and chlorobenzene, a halogenized hydrocarbon type solvent such as dichloroethane and chloroform, a an ether type solvent such as tetrahydrofuran and dioxane, an amide type solvent such as dimethylformamide, an alcohol type solvent such as methanol, an ester type solvent such as methyl acetate and ethyl acetate, a ketone type solvent such as acetone, cyclohexanone and methyl ethyl ketone, and an aqueous solvent. Solution polymerization in which the polymerization is carried out in a uniform system, precipitation polymerization in which the formed polymer is precipitated, emulsion polymerization in which the polymerization is carried out in a micelle state and suspension polymerization carried out in a suspended state can be performed according to selection of the solvent. However, UV absorbing latex obtained via emulsion polymerization is not preferable to be used as an optical film.

The mixing ratio of the UV absorbing monomer, the polymerizable monomer capable of polymerizing with the UV absorbing monomer and the hydrophilic ethylenically unsaturated monomer is suitably determined considering the compatibility of the obtained UV absorbing copolymer with the other transparent polymer and the influence on the transparency and the mechanical strength of the optical compensating film.

The content of the UV absorbing monomer in the polymer derived from the UV absorbing monomer is preferably 1-70%, and more preferably 5-60%, by weight. When the content of the UV absorbent monomer in the UV absorbing polymer is less than 1%, addition of a large amount of the UV absorbing polymer is necessary for satisfying the desired UV absorbing ability so that increasing in the haze or lowering in the transparency and the mechanical strength by the precipitation is caused. On the other hand, when the content of the UV absorbing monomer in the UV absorbing polymer exceeds 70% by weight, the transparent optical compensating film is difficultly obtained sometimes since the compatibility of the polymer with another polymer is lowered. Also, the workability in the film forming process and productivity are reduced due to the decrease in solubility in the solvent.

The hydrophilic ethylenically unsaturated monomer is preferably contained in the UV absorbing copolymer in a ratio of from 0.1 to 50% by weight. When the content is less than 0.1%, the improvement effect on the compatibility of the hydrophilic ethylenically unsaturated monomer cannot be obtained and when the content is more than 50% by weight, the isolation and purification of the copolymer becomes impossible. More preferable content of the hydrophilic ethylenically unsaturated monomer is from 0.5 to 20% by weight. When the hydrophilic group is substituted to the UV absorbing monomer itself, it is preferable that the total content of the hydrophilic UV absorbing monomer and the hydrophilic ethylenically unsaturated monomer is within the above-mentioned range.

For satisfying the content of the UV absorbing monomer and the hydrophilic monomer, it is preferable that the an ethylenically unsaturated monomer having no hydrophilicity is further copolymerized additionally to the above two monomers.

Two or more kinds of the UV absorbing monomer and hydrophilic or non-hydrophilic ethylenically unsaturated monomer may be mixed and copolymerized.

Typically examples of the UV absorbing monomer to be preferably employed in the present invention are listed below, but the monomer is not limited thereto.

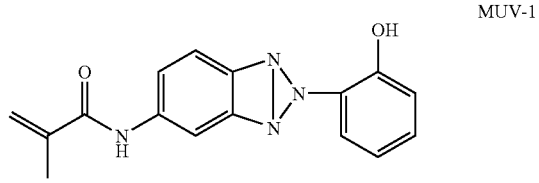

MUV-1

MUV-2
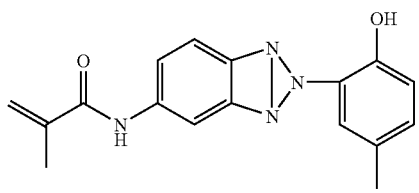
MUV-3
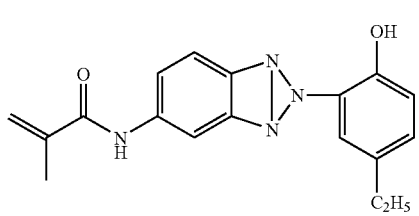
MUV-4
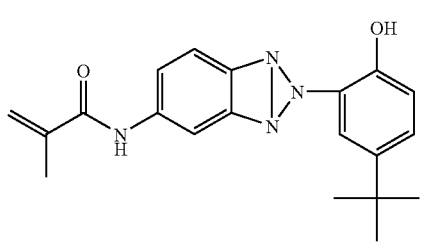
MUV-5
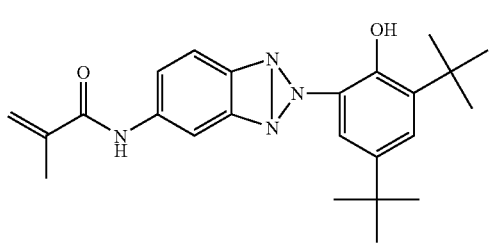
MUV-6
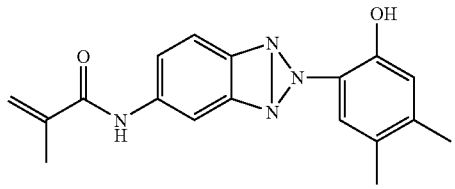
MUV-7
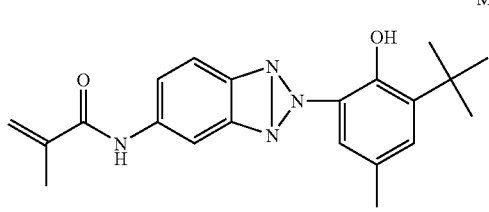
MUV-8
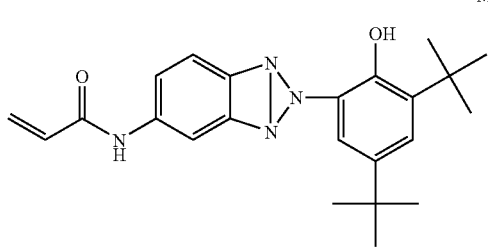
MUV-9
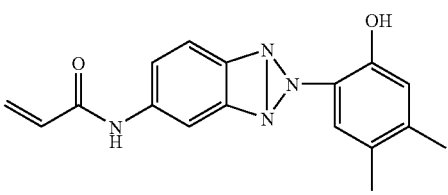
MUV-10
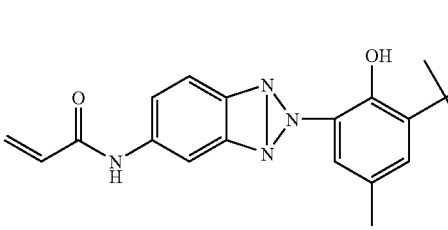
MUV-11
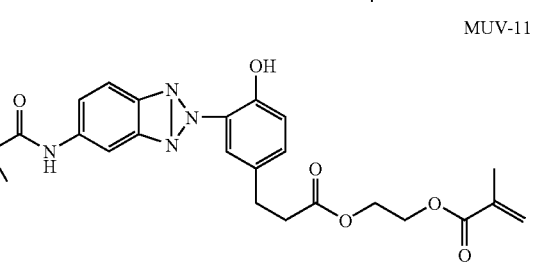
MUV-12
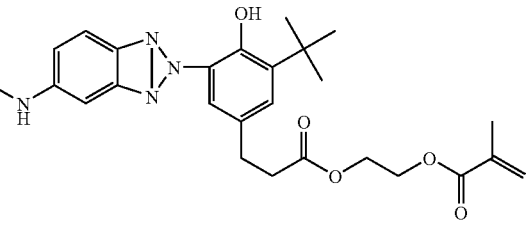
MUV-13
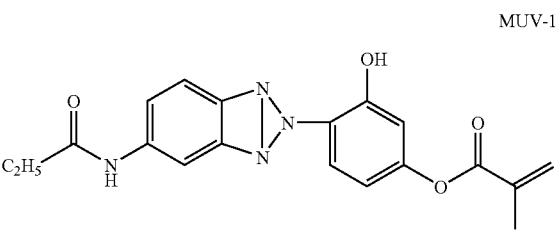
MUV-14
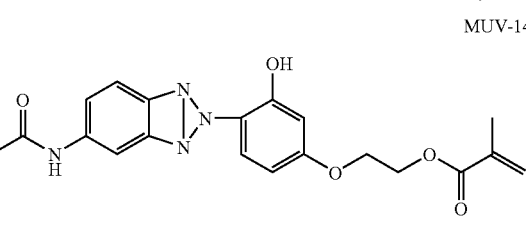
MUV-15
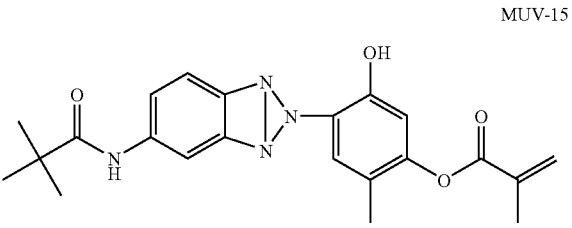

MUV-16
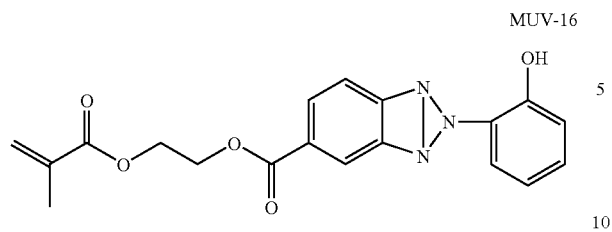
MUV-17
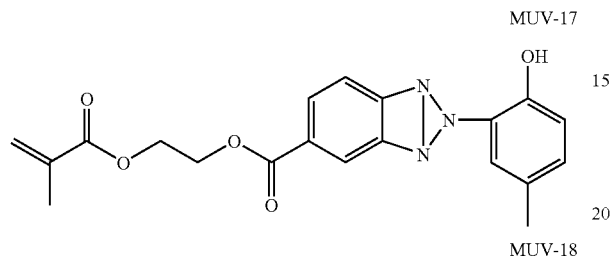
MUV-18
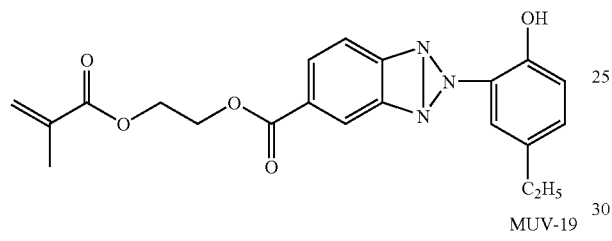
MUV-19
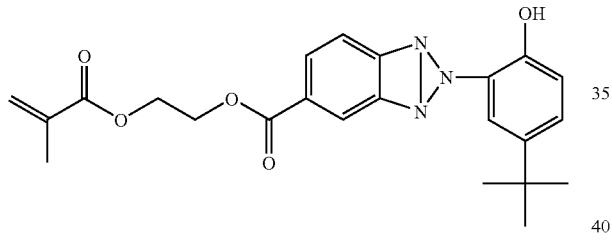
MUV-20
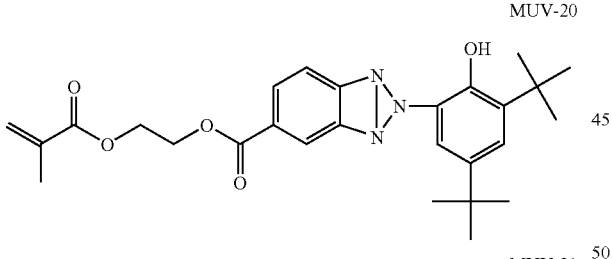
MUV-21
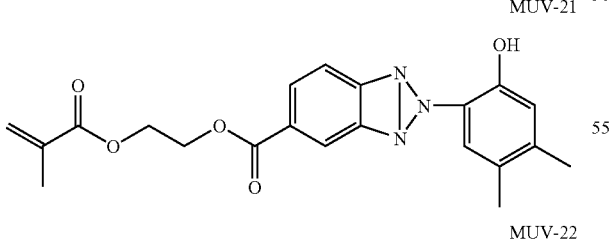
MUV-22
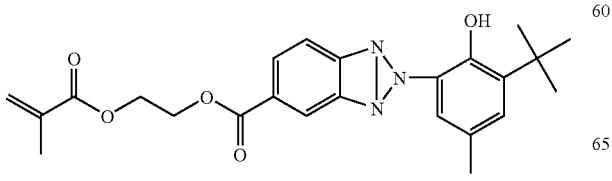
MUV-23
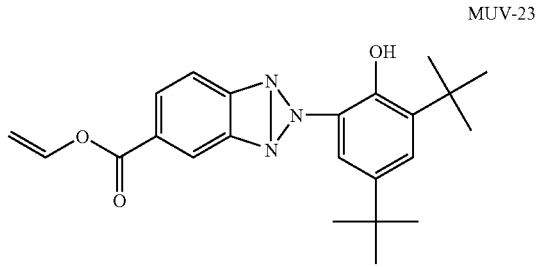
MUV-24
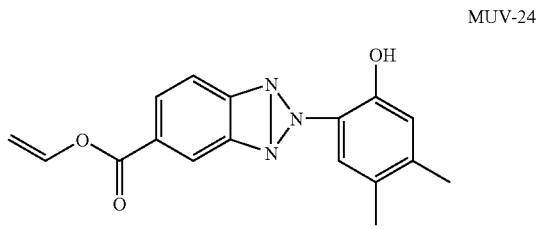
MUV-25
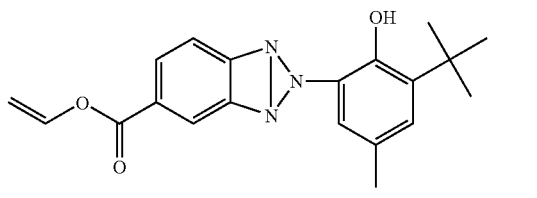
MUV-26
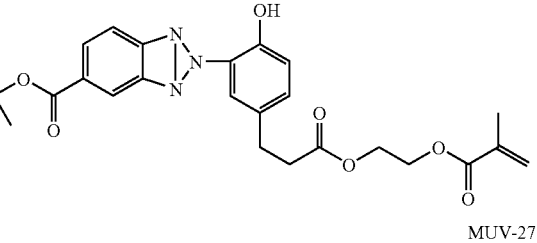
MUV-27
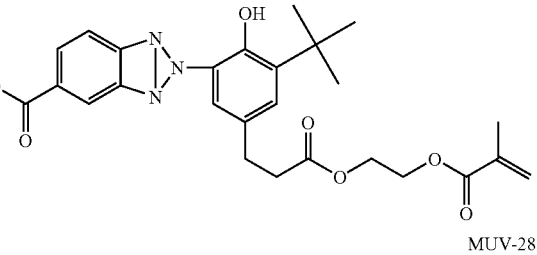
MUV-28
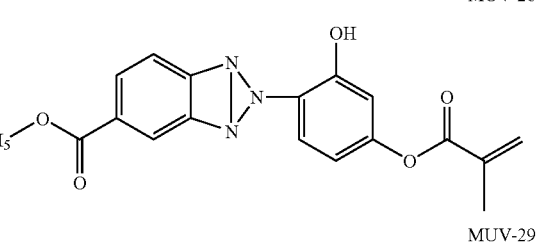
MUV-29
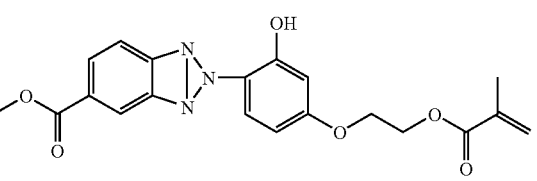

MUV-30
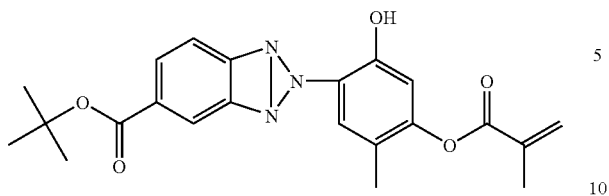
MUV-31
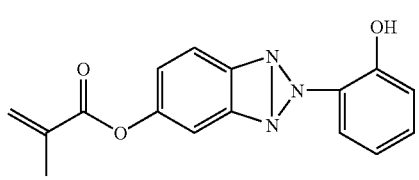
MUV-32
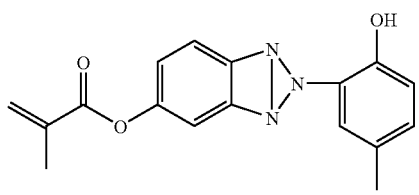
MUV-33
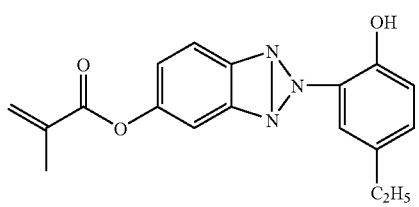
MUV-34
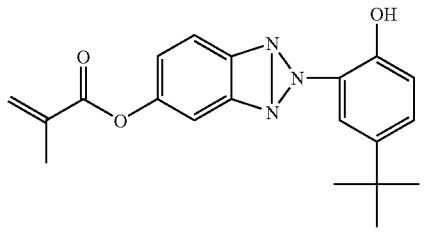
MUV-35
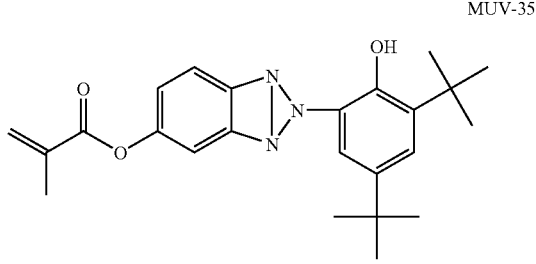
MUV-36
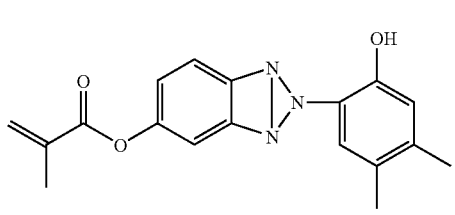
MUV-37
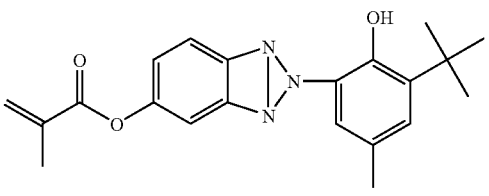
MUV-38
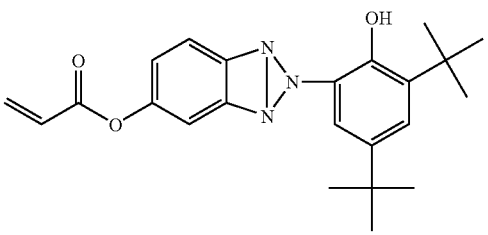
MUV-39
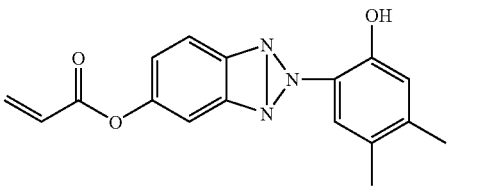
MUV-40
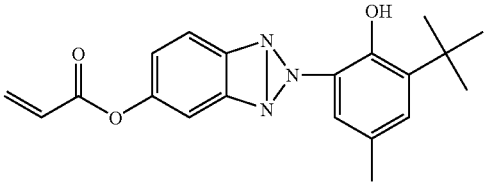
MUV-41
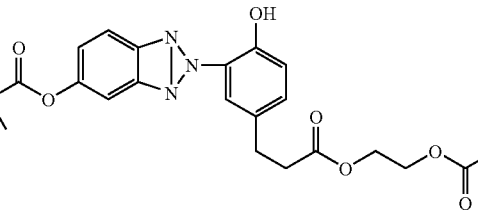
MUV-42
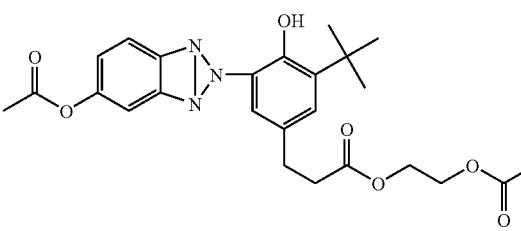
MUV-43
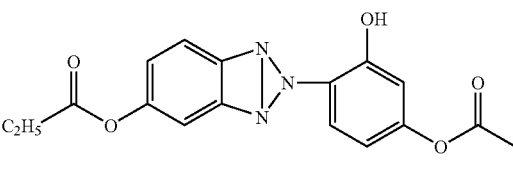

-continued

MUV-44
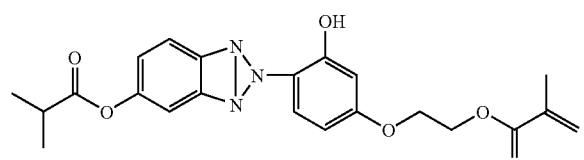

MUV-45
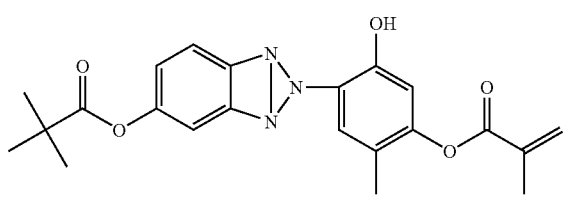

MUV-46
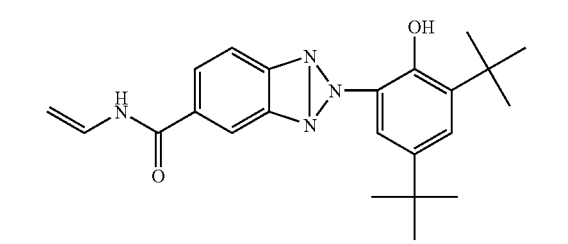

MUV-47
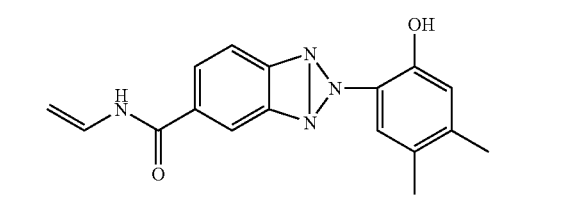

MUV-48
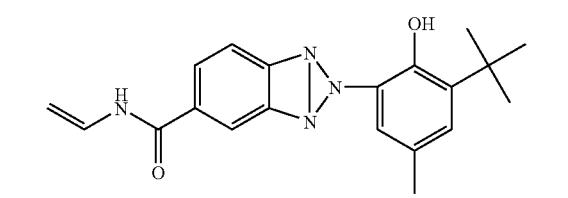

MUV-49
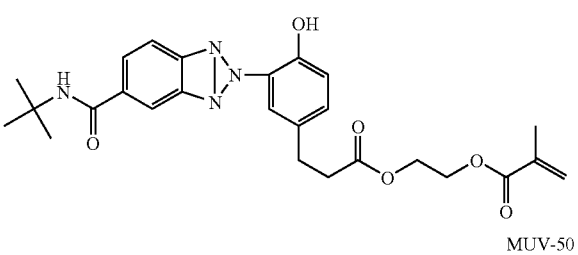

MUV-50
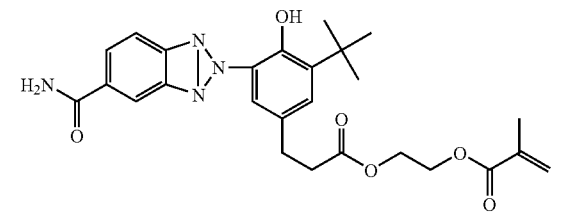

-continued

MUV-51
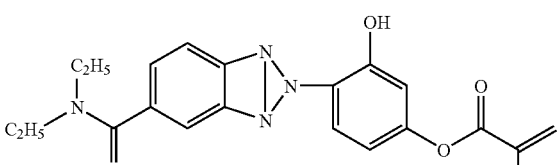

MUV-52
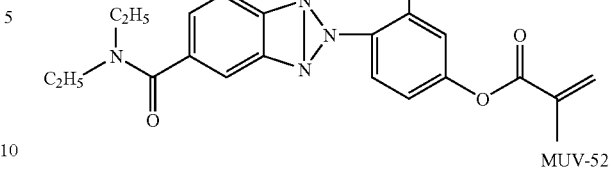

MUV-53

The UV absorbents, UV absorbing monomers and their intermediates to be employed in the present invention can be synthesized by referring published documents. For example U.S. Pat. Nos. 3,072,585, 3,159,646, 3,399,173, 3,761,373, 4,028,331 and 5,683,861, European Patent No. 86,300,416, JP-A Nos. 63-227575 and 63-185969, "Polymer Bulletin" V. 20 (2), 169-176, and "Chemical Abstracts V. 109, No. 191389 can be referred for synthesizing.

The UV absorbent and the CV absorbing polymer to be used in the present invention can be employed together with a low or high molecular weight compound or an inorganic compound according to necessity on the occasion of mixing with the other transparent polymer. For example, it is one of preferable embodiments that the UV absorbent polymer and another relatively low molecular weight UV absorbent are simultaneously mixed with the other transparent polymer. Moreover, simultaneously mixing of an additive such as an antioxidant, a plasticizer and a flame retardant is also one of preferable embodiments.

The ultraviolet light absorber and the ultraviolet light absorbing polymer used in this invention may be added to a cellulose acylate film by being included in the cellulose acylate film or by being coated on the cellulose acylate film. In the case of inclusion in the cellulose acylate film, direct addition and in-line addition are favorable. The in-line addition is a method in which the ultraviolet light absorber and the ultraviolet light absorbing polymer are dissolved beforehand in an organic solvent (such as methanol, ethanol, methylene chloride) and dissolved, and then added to the dope composition using an in-line mixer or the like.

The amount of the ultraviolet light absorber and the ultraviolet light absorbing polymer used in this invention is not fixed and depends of type of compound and the conditions for use. However, in the case of the ultraviolet light absorber, for 1 m$^2$ of cellulose acylate film film, the amount is preferably in the range of 0.2-3.0 g, more preferably 0.4-2.0 g and 0.5-1.5 g is particularly preferable. In the case of the ultraviolet light absorbing polymer, for 1 m$^2$ of cellulose acylate film, it is preferably in the range of 0.6-9.0 g, more preferably 1.2-6.0 g and even more preferably 1.5-3.0 g.

As UV absorbent monomers available on the market, 1-(2-bezotriazole)-2-hydroxy-5-(vinyloxycarbonylethyl)-benzene UVM-1 and a reactive type UV absorbent 1-(2-benzotriazole)-2-hydroxy-5-(2-methacryloyloxyethyl)-benzene RUVA-93, each manufactured by Ootsuka Chemical Co., Ltd., and similar compounds are employable in the present invention. They are preferably employed solely or in a state of polymer or copolymer but not limited thereto. For example, a polymer UV absorbent available on the market PUVA-30M, manufactured by Ootsuka Chemical Co., Ltd., is preferably employed. The UV absorbent may be used in combination of two or more kinds thereof. The method for adding the ultraviolet light absorber to the dope may be by dissolving the ultraviolet light absorber in an organic solvent such as alcohol, methyl chloride, dioxolane or methyl acetate, and then adding it to the dope, or alternatively the ultraviolet light absorber may be directly added to the dope composition.

An antioxidant may be included in the cellulose acylate film of this invention. For example as described in JP-A No. 5-197073, a peroxide decomposing agent, a radical chain-linking agent, or metal deactivator or an acid trapping agent may also be included. The amount in which these compounds are added is preferably in a weight ratio of 1 ppm-1.0%, and more preferably 10-1,000 ppm to the cellulose acylate.

In the present invention, it is preferable that a particle matting agent is included in the cellulose acylate film, and examples of the particle matting agent include particles of inorganic compounds such as silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate or cross-linked particles of high molecular weigh polymers. Of these, silicon dioxide is preferable in view of reduced haze in the film. The average particle diameter of the secondary particles from among the particles is preferably in the range of 0.01-1.0 μm and the amount of these particles included is preferably in the range of 0.005-0.3 percent by weight of the cellulose acylate. The particles such as the silicon dioxide particles are often surface treated using an organic substance, and this is preferable because it reduces haze in the film. Examples of the organic compound used in the surface treatment include halogens, alkoxysilanes (particularly alkoxysilanes having a methyl group), silazanes, and siloxanes. Particles having a larger average particle diameter have a greater matting effect, while particles having a smaller average particle diameter have excellent transparency. Thus among the particles, the primary particles preferably have an average primary particle diameter of 5-50 nm, and more preferably 7-16 nm. These particles are usually present in the cellulose acylate film as an aggregate, and preferably form unevenness of 0.01-1.0 μm in the plane of the cellulose acylate film. Examples of the silicon dioxide particles include Aerosil 200, 200V, 300, R972, R972V, R974, R202, R812, OX50, and TT600 (each manufactured by Aerosil Co., Ltd.), and of these, Aerosil 200V, R972, R972V, R974, R202 and R812 are preferred. Two or more of these matting agents may be combined and used. In the case where 2 or more matting agents are used, they may be mixed in a suitably selected proportion. In this case, matting agents which have different particle size and quality such as Aerosil 200V and R927V may be used in weight proportions in the range from 0.1:99.9 to 99.9:0.1

The method to produce the polarizer protective film of the present invention will now be described.

The method of preparing the cellulose acylate dope of the present invention will be described. Flakes of cellulose acylate are stirred in a dissolution vessel with an organic solvent, which is the main good solvent for the cellulose acylate, and thereby dissolved and the dope is formed. Examples of the dissolution method include a method which is performed at normal pressure; a method which is performed below the boiling point of the main solvent; a method which is performed by applying pressure below the boiling point of the main solvent; a method which is performed by cold dissolution as described in JP-A No. 9-95544, No. 9-95557, or No. 9-95538; and various dissolution methods performed under high pressure as disclosed in JP-A No. 11-21379. After dissolution, the dope is filtered with a filtering material and then defoamed and sent to the next step. The cellulose acylate concentration in the dope is between 10 and 35 percent by weight, and more preferably between 15 and 25 percent. In order to include the above mentioned polymer X useful in the present invention in a cellulose acylate dope, the polymer X is dissolved beforehand in an organic solvent and then added to the cellulose acylate dope, and the method for addition, such as direct addition and the like is not limited. In this case the addition is done such that there is no cloudiness or phase separation of the polymer X in the dope. The amount to be added is as described above.

Examples of good solvents of the cellulose acylate include organic solvents such as, methyl acetate, ethyl acetate, amyl acetate, ethyl formate, acetone, cyclohexanone, methyl acetoacetata, tetrahydrofuran, 1,3-dioxolane, 4-methyl-1,3-dioxolane, 1,4-dioxane, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2-pyrrolidone, N-methyl-2-pyrrolidone, 1,3-dimethyl-2-imidazolidinone, methylene chloride, and bromopropane. Of these, methyl acetate, acetone and methylene chloride are preferably used. Lower alcohols such as methanol, ethanol, butanol and the like can be favorably used along with these organic solvents, since they can improve the solubility of the cellulose acylate in the organic solvent and reduce the viscosity of the dope. It is preferable that organic solvent used with the dope of the present invention is a mixture of a good solvent and a poor solvent for cellulose acylate in view of production efficiency, and a favorable range of proportion for mixing the good solvent and the poor solvent is 70-98 percent by weight of the good solvent and 2-30 percent by weight of the poor solvent. A good solvent in the present invention is defined as a solvent that will dissolve the cellulose acylate that is used on its own while a poor solvent is one that does not dissolve the cellulose acylate on its own. The poor solvent used with the dope of the present invention is not particularly limited, but examples of the solvent that is preferably used include methanol, ethanol, n-butanol, cyclohexane, acetone, cyclohexanone and the like. Selection of the organic solvent for the polymer X used in the present invention is also preferably a good solvent for cellulose acylate. As described above, in the case where the low molecular weight plasticizer is used, conventional method for addition may be used and the plasticizer may be added directly to the dope or dissolved in an organic solvent beforehand and then poured into the dope.

When the various additives described above are added to the cellulose acylate dope, it is preferable that a solution in which the cellulose acylate dope and the various additives are dissolved in a small amount of the cellulose acylate is blended by in-line addition. For example, an in-line mixer such as static mixer SWJ (Toray static in-line mixer, Hi-Mixer, manufactured by Toray Engineering) is preferably used. In the case where the in-line mixer is used, it is preferably applied to a dope in which the cellulose acylate is subjected to concentrated dissolution under high pressure and in this case, a specific type of pressurizing container may be used, which is capable of withstanding a prescribed pressure, and which can be heated under pressure and in which stirring can be performed.

In the present invention, by filtering the cellulose acylate dope, foreign matter, particularly foreign matter that can be mistakenly identified as images in the liquid crystal image display, are removed. It can be said that the quality of the polarizer protective film is determined by this filtration. It is preferable that the absolute filtration accuracy of the filtering material used in this filtration is small, but if the absolute filtration accuracy is too small, there is clogging of the filtration material is likely to occur, and thus the filtering material must be replaced frequently and this causes the problem of reduced productivity. As a result, the absolute filtration accuracy of filtering material for the cellulose acylate dope of the present invention is preferably in the range not mote than 0.008 mm, more preferably in the range of 0.001-0.008 mm, and still more preferably in the range of 0.003-0.006 mm. The quality of the filtering material is not particularly limited, and conventional filtering materials may be used. However, filtering material made from plastic fibers such as polypropylene, Teflon (registered trademark) and the like or filtering material made of metals such as stainless steel are preferable in the view of the fact that there is no falling out of the fibers. Filtration of the cellulose acylate dope of the present invention can be performed using conventional methods, but a method in which filtration is performed while heating under reduced pressure at a temperature which is less that the boiling point of the solvent at atmospheric pressure, and which is within a range in which the solvent does not boil is preferred in view of the fact that increase in differential pressure after filtration (referred to as filtration pressure hereinafter) is small. The preferable temperature range is 45-120° C., more preferably 45-70° C., and still more preferably 45-55° C. The filtration pressure is preferably small. The filtration pressure is preferably no greater than $1.6 \times 10^6$ Pa, more preferably no greater than $1.2 \times 10^6$ Pa, and still more preferably, no greater than $1.0 \times 10^6$ Pa. Including an unsubstituted acyl group or a cellulose acylate with a low degree of acetylation in raw material for the cellulose acylate, sometimes causes foreign material obstruction (sometimes called luminance point hereinafter). A polarizer was placed between two cellulose acylate film samples arranged in a crossed state (crossed Nicol state). The luminance point is a phenomenon which occurs when light was irradiated from one side and observed from the other side using an optical microscope (50 magnification) and if the cellulose acylate film is a normal one, light is blocked and there is darkness and nothing can be seen, while if foreign material is present, light leaks from that area and luminance appears as spots. Actual damage when the cellulose acylate film is used as a liquid crystal image display is large to the extent that that the diameter of the luminance point is large, and the diameter of the luminance point should be no greater than 50 μm, preferably no greater than 10 μm, and still more preferably no greater than 8 μm. It is to be noted that the diameter of the luminance point is the diameter that is measured when the luminance point is approximated to a perfect circle. If the diameter of the luminance point defined here is 400/cm$^2$ or less, there are no problems in terms of practical use, the diameter is preferably 300/cm$^2$ or less, and more preferably 200/cm$^2$ or less. In order to reduce the amount and size of these luminance spots, it is preferable to properly filter fine foreign material. Also, as described in JP-A No. 2000-137115, the method in which a crushed cellulose acylate film which has been formed are added again in the proportion of the dope and used as the materials for the cellulose acylate and the additives is preferably used as the luminance spots are reduced.

Next, the process for casting the cellulose acylate dope on a metal support, the drying process for drying on the metal support, and the peeling process for peeling the web from the metal support will be described. The metal support body is an endless metal belt which can move infinitely or a rotating metal drum with the surface thereof being a mirror surface. The casting process is one in which a dope is pumped to a pressure die through a pressure type metering gear pump, and cast from the pressure die onto a metal support at a casting position. Another casting process is a doctor blade method in which the thickness of the cast dope film is adjusted with a blade or a method using reverse roll coater in which the dope thickness of the cast dope is adjusted with a reverse roller coater rotating reversely. A pressure die is preferred in view of the fact that the slit shape at the opening portion can be regulated and the film thickness is readily regulated to be uniform. Examples of the pressure die include a coat hanger die, a "T" die, and the like, and any of these may be favorably employed. In order to increase the casting speed, two or more pressure dies may be provided on the metal support and dopes divided into two or more may be cast on the metal support and the dope amount may be divided and layered. The thickness of the film may be controlled to a desired thickness by controlling the dope concentration, the amount of dope pumped, the space of the slit in the die opening, the push-out pressure of the die, the speed of the metal support body and the like.

The drying process performed on the metal support is one in which a web is heated on a support and solvents are evaporated. Methods for evaporating solvents, include a method in which hot air is blown from the web side and the backside of the support, a method in which heating is carried out from the back surface of the support using heat transfer by liquid, and a method in which heating is carried out from the surface as well as the back surface using heat radiation. Further, these methods are preferably combined. If the web is thin, drying is quick. The temperature of the support may be the same along the entire support or may be different depending on the position.

The method for performing drying on the metal support which is used in the present invention, is preferably a method in which casting is done on the metal support at a temperature of 0-40° C., and more preferably at a temperature of 5-30° C. The air for drying the web is preferably 30-45° C., but is not limited thereto.

The peeling process is one in which a web, in which the organic solvents have been evaporated on the support, is peeled prior to conveying of the metal support. The peeled web is sent to the drying process. The position at which the web is peeled from the metal support is called the peeling point, and the rollers which aid in the peeling are called peeling rollers. This phenomenon depends on the thickness of the web, but when the residual solvent amount (represented by the formula described below) is too large, it may be difficult to peel the web. On the contrary, when peeling is carried out after fully drying the web on the support, a part of the web may peel before the peeling position. It is generally preferable that web peeling is performed when the residual solvent amount is 20 to 180 percent by weight. The residual solvent amount in the present invention when the film is peeled is preferably 20-40 percent by weight or 60-150 percent by weight, and 80-140 percent by weight is particularly preferable. One method for increasing the speed of film production (the film production speed can be increased because the peeling is performed when the residual solvent amount is a much as possible) is a gel casting method in which peeling can be done even when the residual solvent amount is high. The gel casting methods include a method in which poor solvents with respect to the cellulose acylate are added to a dope and gelling is carried out after casting the dope, and also a method in which gelling is carried out by decreasing the temperature of a support, and the like. There is further a method in which metal salts are added to the dope. By strengthening the web film through gelling the dope on the support, it is possible to carry out earlier peeling and to increase the film formation speed. When the peeling is carried out at the time when the residual solvent amount is still great, the web may be too soft, and during peeling, the flatness of the web is compromised, and formation of wrinkles and longitudinal streaks due to the peeling tension become likely. Accordingly, the residual solvent amount is determined such that economic operation and quality are balanced.

The residual solvent amount used in the present invention is expressed by the formula below.

$$\text{Residual solvent amount(percent by weight)} = \{(M-N)/N\} \times 100$$

In the formula, M represents the weight of the web at a suitably selected point and N represents the weight when M is dried for 3 hours at 110° C.

Furthermore, it is preferable that in the process for drying the cellulose acylate film, the film that has been peeled from the support is further dried to cause the residual solvent amount to 2.0 percent by weight or less, and more preferably 1.0 percent by weight, and still more preferably 0.5 percent by weight or less.

In the drying process, the web is dried by employing a method in which the web is conveyed through rolls placed in a staggered way and drying device or a tenter drying device in which the web is conveyed while holding both edges of the web using clips and maintaining web width or slightly stretching the web in the width direction. In the present invention, it is particularly favorable to maintain or stretch the web width in a suitably selected process subsequent to peeling of the web by the tenter drying device and at a suitably selected point where the residual solvent amount is great, since humidity stability of the optical properties are favorable. The means for drying the web is not particularly limited and the drying is generally carried out by hot air, infrared rays, heat rolling or microwaves. It is preferable that the drying is performed by hot air in view of simplicity. The drying temperature is preferably gradually increased in the range from 40 to 180° C. and more preferably in the range from 50 to 160° C.

(Stretching Operation, Control of Refractive Index)

The retardation value in the thickness direction Rth of the polarizer protective film of the present invention is preferably 40-250 nm, and more preferably 60-250 nm, under a condition of 23° C. and 55% RH. It is most preferably 100-250 nm.

The in-plane retardation value Ro defined by the following Equation of the polarizer protective film of the present invention is preferably 0-110 nm, and more preferably 50-100 nm.

$$Ro = (nx - ny) \times d$$

$$Rth = \{(nx + ny)/2 - nz\} \times d$$

wherein, nx is the largest refractive index in the film plane, ny is a refractive index in the direction perpendicular to the direction giving nx in the film plane, nz is a refractive index in the thickness direction of the film and d is a thickness of film (nm).

The Ro, Rth values can be determined by using an automatic birefringent analyzer KOBRA-21ADH (manufactured by Oji Scientific Instruments), for example, at a wavelength of 590 nm.

In the polarizer protective film of the present invention, control of refractive indices is possible via a stretching operation. As for the stretching operation, by stretching the optical film in a ratio of 1.0-2.0 in one direction and stretching the film in a ratio of 1.01-2.5 in the perpendicular direction thereof in the film plane, refractive indices within preferable ranges can be obtained.

Stretching can be performed sequentially or simultaneously, for example, in the longitudinal direction of the film and in the direction perpendicular thereto in the same plane of the film, namely, in the lateral direction. In this case, if the stretching ratio at least in one direction is insufficient, sufficient retardation cannot be obtained. If it is excessive, stretching difficulties may occur and the film may be teared.

When the material is stretched in the casting direction (the longitudinal direction), the nz value will be excessive if there is excessive shrinkage across the width. This can be avoided by controlling the shrinkage of the film in the width direction or by stretching in the width direction. In the case of stretching in the width direction, distribution may occur to the refractive index in the width direction. This distribution may appear when a tenter method is utilized. Stretching of the film in the width direction causes shrinkage force to appear at the center of the film because the ends are fixed in position. This is considered to be what is called "bowing". In this case, bowing can be controlled by stretching in the longitudinal direction, and the distribution of the retardation in the width direction can be reduced.

Stretching in the biaxial directions perpendicular to each other reduces the fluctuation in the thickness of the obtained film. Excessive fluctuation in the thickness of the optical film will cause irregularity in retardation. When used for liquid crystal display, irregularity in coloring or the like may occur.

The fluctuation in the thickness of the polarizer protective film is preferably kept within the range of ±3%, preferably ±1%. To achieve the aforementioned object, it is effective to use the method of stretching in the biaxial directions perpendicular to each other. The ratio of stretching in the biaxial directions perpendicular to each other is preferably 1.0 through 2.0 times in the longitudinal direction, and 1.01 through 2.5 times in the width direction.

When using a cellulose acylate exhibiting a positive birefringent with respect to stress, stretching in the width direction will provide a slow axis of the retardation film in the width direction. In the present invention, the slow axis preferably lies in the width direction in order to improve display quality such as viewing angle. Also, it is preferable to meet the following condition: (Stretching ratio in the width direction)>(stretching ratio in casting direction). The film of the present invention can also be applied to a so called negative C plate. In this case, a stretching ratio of as small as possible in each of the width direction and the longitudinal direction is preferable in order to suppress the in-plane retardation value.

The method for stretching the web is not particularly limited. Examples include, a method in which a plurality of rolls are caused to have differing peripheral speeds and stretching is done in the casting direction by utilizing the difference in peripheral speed between the rolls; a method in which both ends of the web are fixed with clips or pins and the spaces between the pins or clips are extended in the forward direction to thereby carry out stretching in both the casting and width directions; a method in which widening in the width direction and stretching in the width direction are performed simultaneously; and a method in which widening in the longitudinal direction and stretching in the width direction are performed simultaneously. As a matter of course, these and other methods may be used in combination. In addition, in the case of the so-called tenter method, smooth stretching can be carried out by driving the clip portion using a linear driving method, and this method is favorable because it reduces the risk of, for example, rupture of the film.

Holding the width or stretching in the width direction in the process of preparing the film is preferably performed by using a tenter, and may be performed by a pin tenter or a clip tenter.

The thickness of the polarizer protective film of the present invention is preferably 10-500 μm, specifically 20 μm or more and further 35 μm or more, while specifically 150 μm or less and further 100 μm or less. The thickness is specifically preferably 35-90 μm. When the polarizer protective film is thicker than the above range, the polarizing plate after fabricated becomes too thick, while, when it is thinner than the above range, sufficient retardation becomes difficult to obtain and the moisture permeability becomes too high, resulting in loosing the ability to protect the polarizer against moisture.

Provided that the polarizer protective film of the present invention has a slow axis or a fast axis in the film plane and that the angle thereof between the casting direction of the film is designated as θ1, θ1 is preferably −1° or more and +1° or less, and more preferably −0.5° or more and +0.5° or less. θ1 is defined as an orientation angle, and can be measured by using an automatic birefringent analyzer KOBRA-21ADH (manufactured by Oji Scientific Instruments). When θ1 meets the above condition, high luminance is obtained as well as suppressing or preventing leakage of light in a display image, and high color reproducibility is obtained in a color liquid crystal display.

The width of the polarizer protective film is 1.3 m or more and preferably 1.4-2.8 m in terms of the productivity for a large screen liquid crystal display.

(Functional Layer)

When manufacturing the polarizer protective film, a functional layer such as antistatic layer, hard coat layer, antireflection layer, lubricant layer, adhesive layer, antiglare layer, barrier layer and optical compensation layer can be coated before and/or after stretching. Specifically, it is preferable that at least one selected from antistatic layer, hard coat layer, antireflection layer, adhesive layer, antiglare layer and optical compensation layer is provided. In this case, various forms of surface treatment such as corona discharging, plasma processing, chemical fluid treatment can be provided if necessary.

<Antistatic Layer, Adhesive Layer>

The polarizer protective film of the present invention preferably has antistatic layer 2 and adhesive layer 3 laminated in that order on one surface of polarizer protective film 1, as shown in FIG. 1.

Antistatic layer 2 of the polarizer protective film of the present invention is preferably a layer containing a cationic polymer having an antistatic function or a layer containing a metal oxide as an antistatic agent.

The cationic polymer preferably used in the present invention is, for example, a cationic pendant polymer having a cationic dissociative group in a side chain or a cationic polymer having a cross-linking structure, such as disclosed in Japanese translation of International Nos. 53-13223, 57-15376, 53-45231, 55-145783, 55-65950, 55-67746, 57-11342, 57-19735 and 58-56858, and JP-A Nos. 61-27853 and 62-9346. As specifically preferable cationic polymers, the polymers having the structures represented by following Formulas [3], [1a] and [1b] are cited.

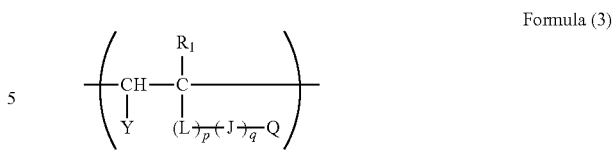

Formula (3)

$R_1$: Hydrogen Atom, Alkyl Group Having 1-4 Carbon Atoms, Halogen Atom

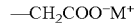

Y: —COO⁻M⁺, Hydrogen Atom, Arylene Group
L: —CONH—, —COO—, —CO—, —O—
J: Alkylene Group of $C_1$-$C_{12}$

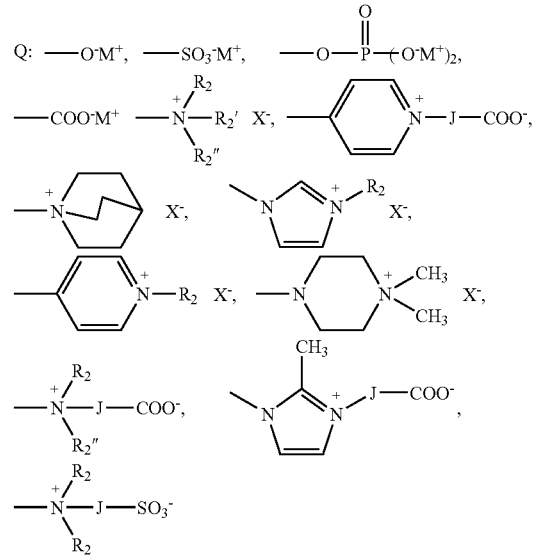

M: Hydrogen Atom, Cation (e.g., Alkaline Metal, Specifically Na, Ca)
$R_2$, $R'_2$, $R''_2$: Alkyl Group Having 1-4 Carbon Atoms
p, q: 0, 1
X⁻: Anion (e.g., Halogen Ion, Sulfonic Acid Anion, Carboxylic Acid Anion)

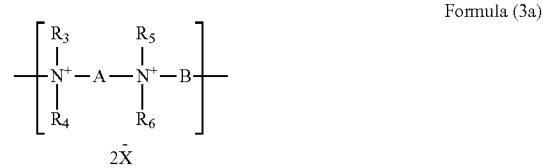

Formula (3a)

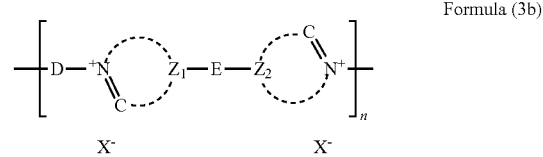

Formula (3b)

In the formulas, $R_3$, $R_4$, $R_5$ and $R_6$ each represent a substituted or unsubstituted alkyl group having 1-4 carbon atoms, $R_3$ and $R_4$, or $R_5$ and $R_6$ may be combined to form a nitrogen containing heterocycle, such as piperazine. A, B, and D each represent an alkylene group, an arylene group, an alkenylene group, an arylene alkylene group, —R$_7$COR$_8$—, —R$_9$COOR$_{10}$COR$_{11}$—, —R$_{12}$OCR$_{13}$COOR$_{14}$—, —R$_{15}$—(OR$_{16}$)m-, —R$_{17}$CONHR$_{18}$NHCOR19-, —R$_{20}$OCONHR$_{21}$NHCOR$_2$—, or —R$_{25}$NHCONHR$_{24}$NHCONHR$_{25}$—, each having 2-10 carbon atoms and each of these groups may be substituted or may be unsubstituted, R$_7$, R$_8$, R$_9$, R$_{11}$, R$_{12}$, R$_{14}$, R$_{15}$, R$_{16}$, R$_{17}$, R$_{19}$, R$_{20}$, R$_{22}$, R$_{23}$, and R$_{25}$ each are an alkylene group, R$_{10}$, R$_{13}$, R$_{18}$, R$_{21}$, and R$_{24}$ each are a linkage group selected from an alkylene group, an alkenylene group, an arylene group, an arylene alkylene group, and an alkylene arylene group, each of which may be substituted or may be unsubstituted, m is a positive integer of 1-4, and X-which is not replaced [substitution or], respectively represent the positive integer of 1-4, and X$^-$ represents an anion.

However, when A is an alkylene group, a hydroxy alkylene group, or an arylene alkylene group, it is preferable that B is not an alkylene group, a hydroxyl alkylene group, or an arylene alkylene group.

E represents the group selected from a joint hand, —NHCOR$_{26}$CONH—, or D. R$_{26}$, represents an alkylene group, an alkenylene group, an arylene group, an arylene alkylene group, or an alkylene arylene group, each of which may be substituted or may be unsubstituted.

Z$_1$ and Z$_2$ each represent a nonmetal atom group necessary to form a 5 membered or a six-membered ring together with the —N═C-group (Z$_1$ and Z$_2$ each may be connect to E in the form of a quaternary salt of ≡N$^+$[X$^-$]—).

n represents an integer of 5-300.

Of these, a quaternary ammonium cationic polymer having a molecular bridge is preferable and a quaternary ammonium cationic polymer having a molecular bridge and containing no chlorine ion is specifically preferable.

Specific examples of a cationic polymer used in the present invention will be shown below, however, the present invention is not limited thereto.

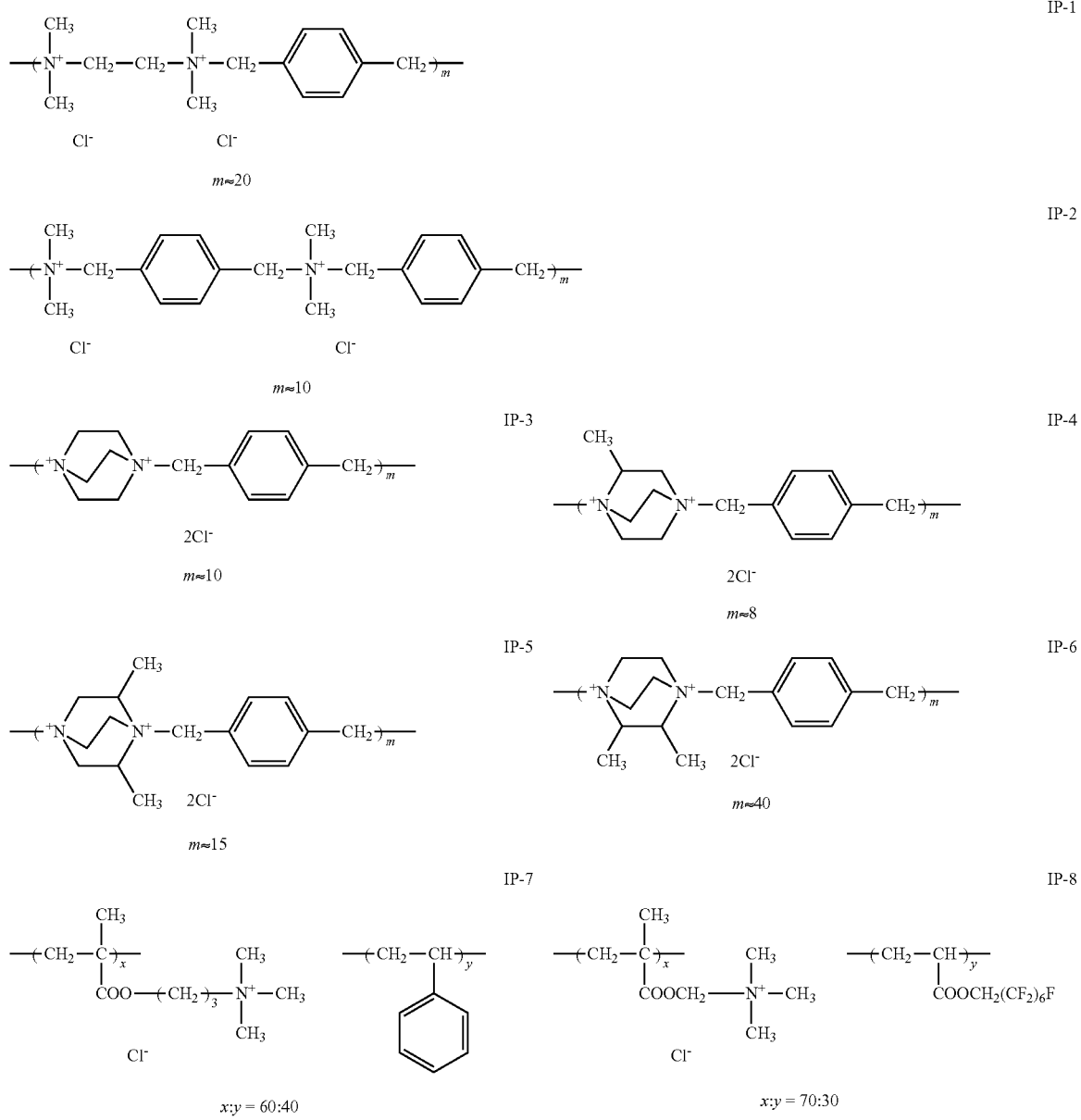

-continued
IP-9
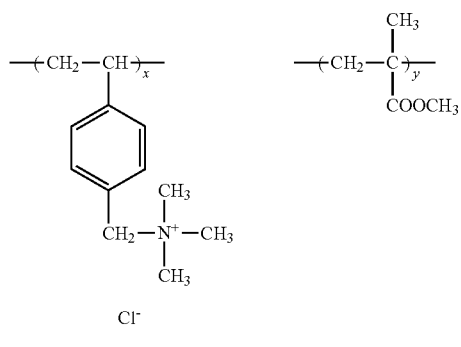
x:y = 50:50
IP-10
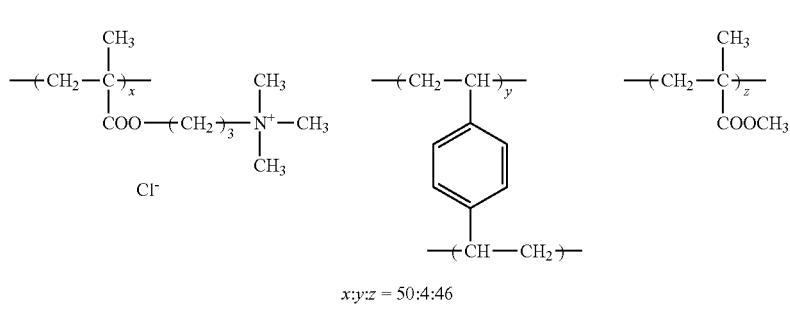
x:y:z = 50:4:46
IP-11
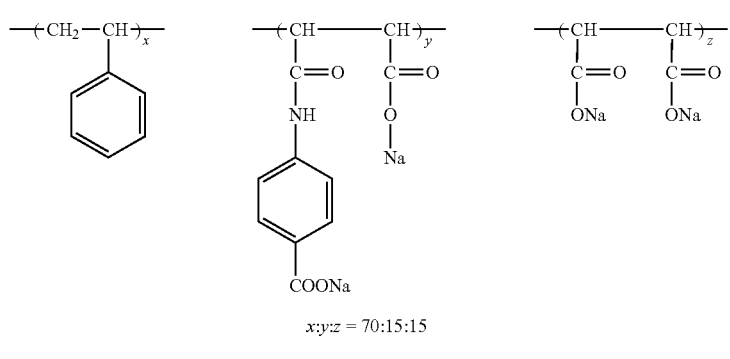
x:y:z = 70:15:15
IP-12
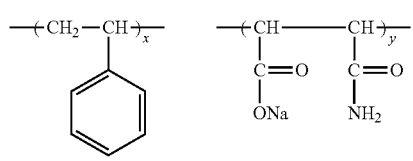
x:y = 50:50
IP-13
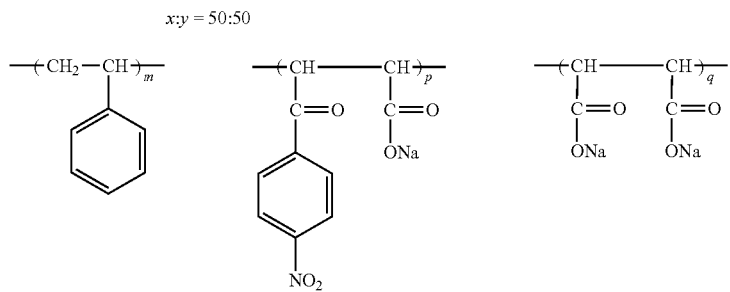
(m = 50, p = 1, q = 49)

-continued
IP-14
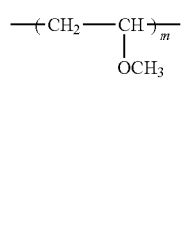 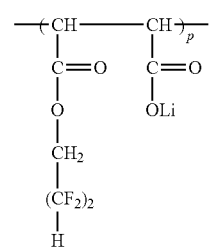 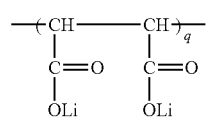
(m = 55, p = 2, q = 43)
IP-15
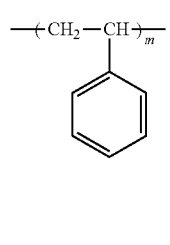 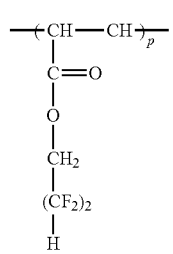 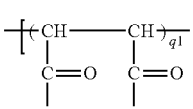 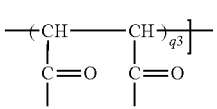
(m = 50, p = 7, q1 = 33, q3 = 10)
IP-16
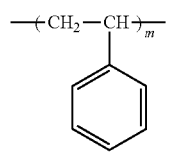 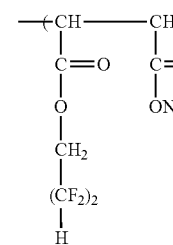 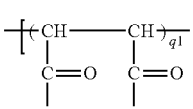
(m = 50, p = 8, q = 42)
IP-17
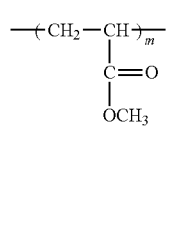 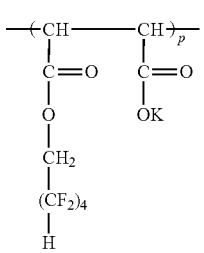 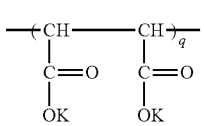 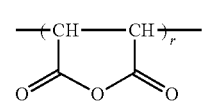
(m = 40, p = 35, q = 20, r = 5)
IP-18
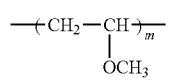 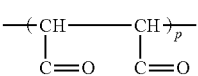 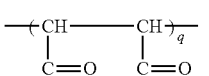
(m = 50, p = 20, q = 30)

-continued
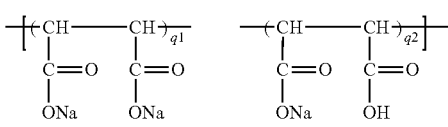
IP-19
($m = 50, p = 20, q1 = 20, q2 = 10$)
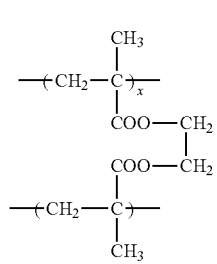
IP-20
$x/s = 5/95$
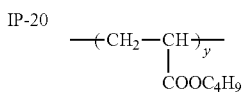
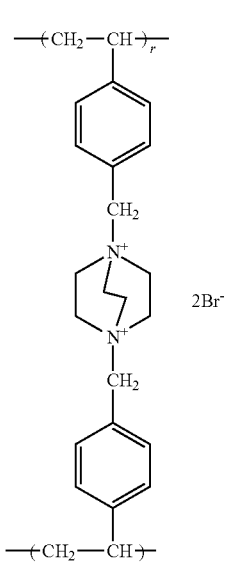
IP-21
$y/r = 7/93$
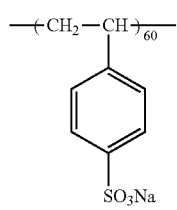 
IP-22
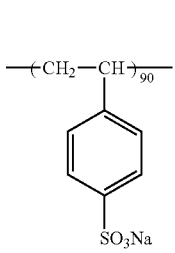 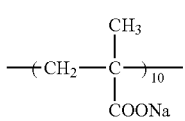
IP-23
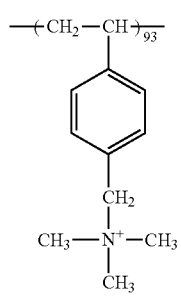 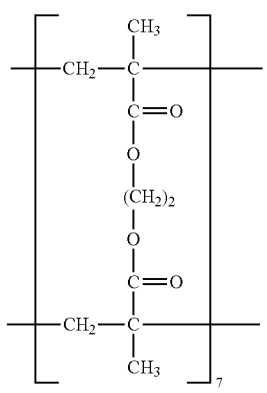
IP-24

The cationic polymer used in the present invention may be used alone or in combination of plural cationic polymers. The content of the cationic polymer in an antistatic layer is 10-80 w % based on the solid content of the layer, and is preferably 20-70 wt %.

Examples of a metal oxide as an antistatic agent include: a tin oxide-containing antistatic agent, an antimony oxide-containing antistatic agent, an indium oxide-containing antistatic agent and a zinc oxide-containing antistatic agent. Of these, a tin oxide-containing antistatic agent is preferable. Examples of a tin oxide-containing antistatic agent include: in addition to tin oxide, antimony doped tin oxide, indium doped tin oxide, aluminum doped tin oxide, tungsten doped tin oxide, a complex of titanium oxide, cerium oxide and tin oxide, and a complex of titanium oxide and tin oxide. The metal oxides are preferably used as particles of particulate type or needle-shaped type. The average particle diameter is about 1-100 nm and preferably 2-50 nm.

Since, the cellulose acylate polarizer protective film may be dissolved in an organic solvent resulting in alteration or deterioration, it is preferable to use a metal oxide as a dispersion (sol) in a hydrophilic solvent. As a hydrophilic solvent, water is preferable. A hydrophilic organic solvent other than water can be contained. As examples of a hydrophilic organic solvent, alcohols, for example Methanol, ethanol, n-propanol, Isopropanol, n-butanol, isobutanol, sec-butanol, Alcohol, such as tert-butanol, n-amyl alcohol, isoamyl alcohol, sec-amyl alcohol, tert-amyl alcohol, 1-ethyl 1-propanol, 2-methyl-1-butanol, n-hexanol, and cyclohexanol, are cited.

Moreover, as a forming material of the antistatic layer, a binder can also be added together with the cationic polymer or the metal oxide which are the above-mentioned antistatic agents, in order to improve the film forming nature of the antistatic layer or the adhesion to the film. When a metal oxide is used as dispersion liquid, a water-soluble or water dispersible binder is used. Example of a binder include: a polyurethane resin, a polyester resin, an acrylic resin, a polyether resin, a cellulose resin, a polyvinyl-alcohol resin, an epoxy resin, polyvinyl pyrrolidone, a polystyrene resin, polyethylene glycol, pentaerythritol and a cellulose acylate. A polyurethane resin, a polyester resin, an acrylic resin and a cellulose acylate are specifically preferable. These binders can be used alone or in combination of two or more according to the purpose of application. The amount of the binder, when using a metal oxide, depends on the metal oxide, however, it is 200 weight parts or less in 100 weight parts of metal oxide, and is preferably 5-150 weight parts.

The surface resistivity of the above mentioned antistatic layer is preferably $1\times10^{12}$ ohms/□ or less and preferably $1\times10^{11}$ ohms/□ or less. When the surface resistivity exceeds $1\times10^{12}$ ohms/□, the antistatic function is not enough, and static electricity is occurred and charged by peeling of a surface protection film or by friction of a polarizer protective film, resulting in breakage of the circuit of a liquid crystal cell or poor orientation of liquid crystals.

It is preferable that the adhesive of which storage modulus at 25° C. is $1.0\times10^4$ Pa-$1.0\times10^9$ Pa is used in at least a part of the adhesive layer as an adhesive used for the adhesive layer. The storage modulus is more preferably $1.0\times10^5$ to $1.0\times10^9$ Pa. When the elastic modulus of the above-mentioned adhesive is less than $1.0\times10^4$ Pa, sufficient adhesiveness may not be obtained, and axial deviation or peeling when heat resist test is carried out may occur. When the elastic modulus exceeds $1.0\times10^9$ Pa, crack or chip may be generated in the punching process, since the adhesive is too hard. Although the type of the adhesive is not specifically limited, a curable adhesive which can form a polymer or a cross-linked structure according to various reaction after the adhesive is applied and pasted is preferably utilized. Specific examples of an adhesive include: curable adhesives such as an urethane adhesive, an epoxy adhesive, an aqueous polymer-isocyanate adhesive, a heat curable acrylic adhesive; anaerobic adhesives such as a moisture curable urethane adhesive, a polyether methacrylate adhesive, an ester type methacrylate adhesive, an oxidation type polyether methacrylate adhesive; a cyanoacrylate quick-drying adhesive; and an acrylate-peroxide 2 liquid type quick-drying adhesive. An antistatic agent may be mixed with an adhesive using a well-known method.

The method to form the above antistatic layer or the adhesive layer is not specifically limited, but common methods, for example, a gravure coating, a micro gravure coating, a comma coating, a bar coating, a spray coating, and an ink jet method are cited.

<Measuring Method of the Storage Modulus of Adhesive Layer>

The adhesive layer forming composition is applied on a polyethylene terephthalate film support. This film is then peeled and the storage modulus at 25° C. of the adhesive layer is measured with a dynamic viscoelasticity measuring device ("ARES" by Rheometric Scientific) in the temperature-raising mode (heating-rate of 5° C./min. at the frequency of 10 Hz).

(Polarizing Plate)

The polarizing plate of the present invention will now be explained.

The polarizing plate can be prepared by a general method. The back surface of the polarizer protective film of the present invention is subjected to an alkali saponification treatment. It is preferable that the saponified polarizer protective film is adhered on at least one surface of a polarizer film prepared by stretching while the film is immersed in an iodine solution using a completely saponified type polyvinyl alcohol aqueous solution. On the other surface of the polarizer film, the above mentioned polarizer protective film may be utilized or another polarizer protective film may be utilized. The polarizer protective film utilized on the surface opposite to the surface where the polarizer protective film of the present invention is utilized is preferably a cellulose acylate film having an in-plane retardation value Ro of 0 to 10 nm and a Rth value of −30 to 30 nm, the retardation values being measured at 590 nm. By using a polarizer protective film in combination with the polarizer protective film of the present invention, a polarizing plate exhibiting excellent flatness and a stable viewing angle expanding effect can be obtained.

Examples of a polarizer protective film preferably utilized on the opposite surface include, as commercially available cellulose acylate film: KC8UX, KC4UX, KC5UX, KC8UCR3, KC8UCR4, KC8UCR5, KC8UY, KC4UY, KC10UDR, KC8UY-HA and KC8UX-RHA (produced by Konicaminolta Opto, inc.).

The polarizer protective film of the present invention is produced as a long roll film. Accordingly, it is most advantageous when a polarizing plate is produced by laminating with a polarizer also produced as a long roll film. Also, the cellulose acylate film of the present invention may be used as merely a retardation film, for example, by further laminating onto a polarizing plate.

Polarizer film as a primary constituent element of a polarizing plate is an element which passes light having a polarized wave plane in a predetermined direction, and typical polarizer film commonly known at present is polyvinyl alcohol polarizer film, which is classified into a polyvinyl alcohol film being dyed with iodine and one being dyed with dichroic dye, however, the polarizer film is not limited thereto. Polarizer film is prepared by film formation from polyvinyl alcohol aqueous solution, and the obtained film is uniaxially stretched and dyed, or is uniaxially stretched after dying, preferably followed by being subjected to a durability treatment with a boron compound. A polarizer film having the thickness of 5-30 μm is preferably used.

A polarizing plate may be constructed by further laminating a protective film on one surface and a separate film on the other surface. The protective film and the separate film are used to protect the polarizing plate when it is shipped or it is subjected to a product inspection. In this case, the protective film is laminated to protect the surface of the polarizing plate and used on the surface opposite to the surface adhered to a liquid crystal cell. The separate film is used to cover the adhesive layer used to adhere the polarizing plate onto a liquid crystal cell, and used on the surface adhered to the liquid crystal cell.

(Liquid Crystal Display)

When a polarizing plate is installed into a liquid crystal display, by adhering the polarizer protective film of the present invention on the surface of the polarizing plate adhering onto the liquid crystal cell, varieties of liquid crystal displays exhibiting excellent visibility can be obtained.

As described above, it is preferable that adhesion onto the liquid crystal cell is carried out using an acrylic adhesive.

The polarizer protective film of the present invention can be preferably used for a reflective LCD, transmissive LCD or transflective LCD, or for LCDs of various modes, such as, TN mode, STN mode, OCB mode, HAN mode, VA mode (PVA mode, MVA mode; vertical alignment mode) or IPS mode. Specifically, it is preferably used for a vertical alignment mode liquid crystal display. When it was used for a large screen vertical alignment mode liquid crystal display of 30 size or more, effects of reduced color unevenness and wavy unevenness were obtained, as well as feeling less eye-fatigue even after a long observation.

EXAMPLES

The present invention will now be explained using examples, however, the present invention is not limited thereto.

Example 1

<Synthesis of Polymer X>

Charged into a glass flask equipped with a stirrer, two dripping funnels, a gas feeding tube, and a thermometer were 40 g of a mixture of monomers Xa and Xb of the type and ratio described in Tables 1 and 2, 2 g of mercaptopropionic acid as a chain transfer agent, and 30 g of toluene. The resulting mixture was heated to 90° C. Thereafter, 60 g of the mixture of monomers Xa and Xb of the type and ratio described in Tables 1 and 2 was dripped over 3 hours from one dripping funnel, while 0.4 g of azobisisobutyronitrile dissolved in 14 g of toluene was simultaneously dripped from the other dripping funnel over 3 hours. Thereafter, 0.6 g of azobisisobutyronitrile, dissolved in 56 g of toluene, was dripped over 2 hours, and reaction was performed for an additional 2 hours, whereby Polymer X was obtained. The polymer X was a solid at an ambient temperature. The polymers having different molecular weights were prepared by varying the added amount of mercaptopropionic acid as a chain transfer agent and the adding rate of azobisisobutyronitrile. The weight average molecular weight of each polymer X was determined by the following method and listed in Tables 1 and 2.

MA, MMA, HEA, and HEMA, described in Tables 1 and 2, are abbreviations of the following compounds.

MA: methyl acrylate
MMA: methyl methacrylate
HEMA: 2-hydroxyethyl methacrylate (Determination of Molecular Weight)

The weight average molecular weight was determined employing high performance liquid chromatography.

Measurement conditions were as follows:
Solvent: methylene chloride
Columns: SHODEX K806, K805, and K803G (produced by Showa Denko K.K., employed by connecting three columns)
Column temperature: 25° C.
Sample concentration: 0.1% by weight
Detector: RI Model 504 (produced by GL Science Co.)
Pump: L6000 (produced by Hitachi, Ltd.)
Flow rate: 1.0 ml/minute
Calibration curve: a calibration curve based on 13 samples of standard POLYSTYRENE STK standard POLYSTYRENE (produced by TOSOH Corp.) at an Mw of 500-1,000,000 was employed. Thirteen samples at an almost equal interval were employed.

<Synthesis Example of Polymer UV Absorber P-1>

Synthesis of 2(2'-hydroxy-5'-t-butyl-phenyl)-5-carboxylic acid-(2-methacryloyloxy) ethyl ester-2H-benzotriazole (Exemplified Compound MUV-19) was carried out based on the method described below.

Dissolved in 160 ml of water was 20.0 g of 3-nitro-4-amino-benzoic acid, and 43 ml of concentrated hydrochloric acid was added. After adding 8.0 g of sodium nitrite dissolved in 20 ml of water at 0° C., the resulting mixture was stirred for 2 hours while maintaining the temperature at 0° C. Dripped into the resulting solution at 0° C. was 17.3 g of 4-t-butylphenol dissolved in 50 ml of water and 100 ml of ethanol while maintaining alkalinity by the addition of potassium carbonate. The resulting solution was stirred at 0° C. for one hour and for an additional hour at room temperature. The reaction solution was acidified by the addition of hydrochloric acid and the resulting precipitates were collected via filtration, and subsequently washed well with water.

Precipitates collected via filtration were dissolved in 500 ml of 1 mol/L aqueous NaOH solution. After adding 35 g of zinc powder, 110 g of a 40% aqueous NaOH solution was dripped. After dripping, stirring was carried out for about 2 hours, followed by filtration and water washing. The filtrate was neutralized by the addition of hydrochloric acid. The resulting precipitates were collected via filtration, washed with water and dried. Thereafter, re-crystallization was conducted employing a solvent mixture of ethyl acetate and acetone, whereby 2(2'-hydroxy-5'-t-butyl-phenyl)-5-carboxylic acid-2H-benzotriazole was prepared.

Subsequently added to 100 ml of toluene were 10.0 g of 2(2'-hydroxy-5'-t-butyl-phenyl)-5-carboxylic acid-2H-benzotriazole, 0.1 g of hydroquinone, 4.6 g of 2-hydroxyethyl methacrylate, and 0.5 g of p-toluenesulfonic acid, and the resulting mixture was refluxed for 10 hours in a flask fitted with an ester pipe while heated. The reaction solution was poured into water and precipitated crystals were collected via filtration, washed with water, dried, and recrystallized via ethyl acetate, whereby 2(2'-hydroxy-5'-t-butyl-phenyl)-5-carboxylic acid-(2-methacryloyloxy)ethyl ester-2H-benzotriazole, which was Exemplified Compound MUV-19, was prepared.

Subsequently, a copolymer (being Polymer UV Absorber P-1) of 2(2'-hydroxy-5'-t-butyl-phenyl)-5-carboxylic acid- (2-methacryloyloxy)ethyl ester-2H-benzotriazole and methyl methacrylate was synthesized based on the following method.

Added to 80 ml of tetrahydrofuran were 4.0 g of 2(2'-hydroxy-5'-t-butyl-phenyl)-5-carboxylic acid-(2-methacryloyloxy)ethyl ester-2H-benzotriazole, synthesized as above, and 6.0 g of methyl methacrylate, followed by the addition of 1.14 g of azoisobutyronitrile. The resulting mixture was refluxed, while heated, for 9 hours under a nitrogen atmosphere. After distilling off tetrahydrofuran under vacuum, the resulting products were re-dissolved in 20 ml of tetrahydrofuran, and the resulting solution was dripped into an excessive amount of methanol. The resulting precipitates were collected via filtration and dried at 40° C. under vacuum, whereby 9.1 g of a gray powdered polymer, which corresponded to Polymer UV Absorber P-1, was prepared. The number average molecular weight of the resulting polymer was confirmed to be 4,500, according to the GPC analysis employing the standard polystyrene. Further, the above copolymer was identified as a copolymer of 2(2'-hydroxy-5'-t-butyl-phenyl)-5-carboxylic acid-(2-methacryloyloxy)ethyl ester-2H-benzotriazole with methyl methacrylate. The composition of the above copolymer was 2(2'-hydroxy-5'-t-butyl-phenyl)-5-carboxylic acid-(2-methacryloyloxy) ethyl ester-2H-benzotriazole:methyl methacrylate was approximately 40:60.

(Preparation of Dope)

Cellulose acylate (cellulose propionate (denoted as CAP in Tables 1 and 2), after dried for 24 hours at 60° C. under vacuum, acetyl substitution degree of 1.5, propionyl substitution degree of 0.95 and total acyl substitution

| | |
|---|---|
| Cellulose acylate(cellulose propionate (denoted as CAP In Tables 1 and 2), after dried for 24 hours at 60° C. under vacuum, acetyl substitution degree of 1.5, propionyl substitution degree of 0.95 and total acyl substitution degree of 2.45) | 100 parts by weight |
| Polymer X | 15 parts by weight |
| Polymer UV Absorber P-1 | 3 parts by weight |
| silicon oxide particles (AEROSIL R972 produced by Nippon Aerosol Co., Ltd.) | 0.1 part by weight |
| Methylene chloride | 300 parts by weight |
| Ethanol | 40 parts by weight |

(Casting of Cellulose Acylate Film)

The above dope was prepared, filtered employing FINE MET NF, produced by Nippon Seisen Co. Ltd. and subsequently, at 22° C., cast onto a stainless steel band support homogeneously to a width of 2 m, employing a belt casting apparatus. The solvents in the cast dope were evaporated on the stainless steel band so that the residual solvent amount reached 100%, and the resulting web was peeled from the stainless steel band at a peeling tension of 162 N/m, dried at 35° C. and then slit to a width of 1.6 m. Thereafter, drying was performed at a drying temperature of 135° C. while being stretched at a factor of 1.1 in the lateral direction of the film employing a tenter. During this operation, the residual solvent amount was 10% at the beginning of stretching employing the tenter. After stretching by the tenter, the film was relaxed for 5 minutes at 130° C., the film was passed through dry zones at temperatures of 120° C. and 130° C. while conveying with many rollers, whereby drying was completed. The resulting film was slit to a width of 1.5 m, and knurling, at a width of 10 mm and a height of 5 μm, was applied to both edges of the film. Subsequently, the resulting film was wound onto a core at an inner diameter of 6 inches at an initial tension of 220 N/m and a final tension of 110 N/m, whereby cellulose acylate film 1 was obtained. The stretching factor in the MD direction, calculated based on the rotation rate of the stainless steel band support and the driving rate of the tenter was 1.01. The residual solvent amount, the thickness, and the roll length of each cellulose film listed in Tables 1 and 2 were 0.1%, 60 μm, and 4,000 m, respectively.

Cellulose acylate films 2-30 were prepared in the same manner as Cellulose acylate film 1, except that the kind of cellulose acylate, the kind and adding amount of polymer X, the kind and adding amount of additive were changed as shown in Tables 1 and 2. Cellulose acylate film 31 was prepared in the same manner as cellulose acylate film 9, except that the evaporation of solvent was carried out so that the residual solvent amount at the beginning of tenter stretching was 0.2%.

In Tables 1 and 2, CAP represents the above mentioned cellulose acetate propionate, DAC represents diacetyl cellulose (Daicel Chemical Industries, L-50), and TAC represents cellulose triacetate (the cellulose triacetate, acetyl substitution degree of 2.87 which was synthesized using cotton linter).

In Tables 1 and 2, the following compound was used as a retardation control agent 1.

Retardation Control Agent 1

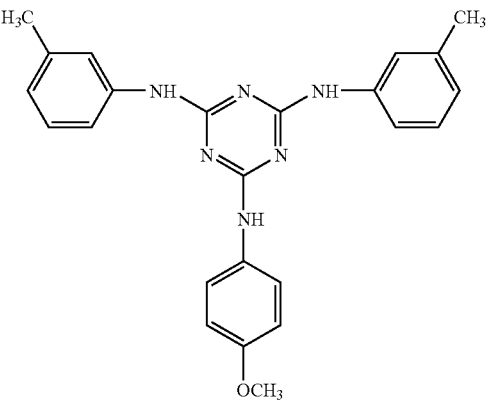 [SMILES: COc1ccc(Nc2nc(Nc3cccc(C)c3)nc(Nc3cccc(C)c3)n2)cc1]

The retardation values Rth and Ro of prepared cellulose acylate films 1-31 were measured as described below and listed in Tables 1 and 2.

(Retardation Value Rth)

Three-dimensional refractive indices at a wavelength of 590 nm of each of cellulose aster films 1-31 were determined at 10 positions at 23° C. and 55% RH, employing an automatic birefringence analyzer (KOBRA-21ADH, produced by Oji Scientific Instruments) and refractive indices nx, ny, and nz were obtained. The thickness direction retardation value Rth was obtained based on the following formula. Determination was carried out at ten positions for each film and the average value was obtained.

$$Rth\{(nx+ny)/2-nz\} \times d$$

wherein nx represents the maximum refractive index in the film plane, represents the refractive index in the direction perpendicular to the direction giving nx in the film plane, and nz represents the refractive index of in the thickness direction of the film, and d (nm) represents the thickness of the film.

TABLE 1

| *1 | Kind | Cellulose acylate Acetyl substitution degree | Cellulose acylate Propionyl substitution degree | Cellulose acylate Total acyl substitution degree | Polymer X Xa Monomer | Polymer X Xa Ratio (%) | Polymer X Xb Monomer | Polymer X Xb Ratio (%) | Polymer X Weight average molecular weight | ** | Additive Kind | Additive ** | Rth (nm) | Ro (nm) | Remarks |
|---|---|---|---|---|---|---|---|---|---|---|---|---|---|---|---|
| 1 | CAP | 1.5 | 0.95 | 2.45 | MMA | 80 | HEMA | 20 | 5000 | 15 | — | — | 134 | 52 | Inv. |
| 2 | CAP | 1.5 | 0.99 | 2.49 | MMA | 80 | HEMA | 20 | 5000 | 15 | — | — | 130 | 52 | Inv. |
| 3 | CAP | 1.5 | 0.95 | 2.45 | MMA | 80 | HEMA | 20 | 6000 | 15 | — | — | 133 | 52 | Inv. |
| 4 | CAP | 1.1 | 1.35 | 2.45 | MMA | 80 | HEMA | 20 | 30000 | 15 | — | — | 135 | 53 | Inv. |
| 5 | CAP | 1.1 | 1.35 | 2.45 | MMA | 80 | HEMA | 20 | 11000 | 15 | — | — | 133 | 52 | Inv. |
| 6 | CAP | 1.1 | 1.35 | 2.45 | MMA | 80 | HEMA | 20 | 3000 | 15 | — | — | 131 | 52 | Inv. |
| 7 | CAP | 1.1 | 1.35 | 2.45 | MMA | 100 | — | — | 3000 | 15 | — | — | 130 | 52 | Inv. |
| 8 | CAP | 1.1 | 1.35 | 2.45 | MA | 100 | — | — | 1000 | 10 | — | — | 130 | 52 | Inv. |
| 9 | CAP | 1.1 | 1.35 | 2.45 | MMA | 80 | HEMA | 20 | 6000 | 10 | *5 | *5 | 128 | 51 | Inv. |
| 10 | CAP | 1.7 | 0.75 | 2.45 | MMA | 80 | HEMA | 20 | 6000 | 15 | — | — | 133 | 52 | Inv. |
| 11 | DAC | 2.41 | 0 | 2.41 | MMA | 80 | HEMA | 20 | 6000 | 15 | — | — | 133 | 52 | Inv. |
| 12 | CAP | 1.3 | 1.05 | 2.35 | MMA | 80 | HEMA | 20 | 6000 | 25 | — | — | 135 | 53 | Inv. |
| 13 | CAP | 1.05 | 1.15 | 2.2 | MMA | 80 | HEMA | 20 | 6000 | 5 | — | — | 209 | 78 | Inv. |
| 14 | CAP | 0.8 | 1.35 | 2.15 | MMA | 80 | HEMA | 20 | 6000 | 30 | — | — | 135 | 53 | Comp. |
| 15 | DAC | 2.14 | 0 | 2.14 | MMA | 80 | HEMA | 20 | 6000 | 30 | — | — | 135 | 53 | Comp. |
| 16 | CAP | 1.1 | 1.35 | 2.45 | — | — | — | — | — | — | *2 | *6 | 209 | 78 | Comp. |
| 17 | CAP | 1.85 | 0.8 | 2.65 | — | — | — | — | — | — | *2 | *6 | 133 | 52 | Comp. |

*1: Cellulose acylate film No., Inv.: Inventive, Comp.: Comparative
*2: Triphenylphosphate(TPP)/Ethylphthalylethyl glycolate(EPEG)
*5: Polymer X used in cellulose acylate film No. 8
*6: Triphenylphosphate(TPP) 8 weight parts/Ethylphthalylethyl glycolate(EPEG) 2 weight parts,
** Added amount (weight part)

TABLE 2

| *1 | Kind | Cellulose acylate Acetyl substitution degree | Cellulose acylate Propionyl substitution degree | Cellulose acylate Total acyl substitution degree | Polymer X Xa Monomer | Polymer X Xa Ratio (%) | Polymer X Xb Monomer | Polymer X Xb Ratio (%) | Polymer X Weight average molecular weight | ** | Additive Kind | Additive ** | Rth (nm) | Ro (nm) | Remarks |
|---|---|---|---|---|---|---|---|---|---|---|---|---|---|---|---|
| 18 | TAC | 2.87 | 0 | 2.87 | MMA | 80 | HEMA | 20 | 6000 | 15 | *3 | 2 | 133 | 52 | Comp. |
| 19 | CAP | 1.5 | 1.04 | 2.54 | MMA | 80 | HEMA | 20 | 6000 | 15 | *3 | 1 | 133 | 52 | Comp. |
| 20 | CAP | 1.5 | 1.04 | 2.54 | MMA | 80 | HEMA | 20 | 6000 | 5 | — | — | 105 | 29 | Comp. |
| 21 | CAP | 1.6 | 1.04 | 2.64 | MMA | 80 | HEMA | 20 | 6000 | 10 | *3 | 2 | 133 | 52 | Comp. |
| 22 | TAC | 2.87 | 0 | 2.87 | MMA | 80 | HEMA | 20 | 6000 | 30 | *3 | 2 | 115 | 34 | Comp. |
| 23 | CAP | 1.1 | 1.35 | 2.45 | — | — | — | — | — | — | *4 | 5 | 133 | 52 | Comp. |
| 24 | CAP | 1.3 | 1 | 2.3 | MMA | 80 | HEMA | 20 | 6000 | 5 | — | — | 200 | 71 | Inv. |
| 25 | CAP | 1.3 | 1 | 2.3 | MMA | 80 | HEMA | 20 | 6000 | 2 | — | — | 250 | 81 | Inv. |
| 26 | CAP | 1.35 | 1.1 | 2.45 | MMA | 80 | HEMA | 20 | 6000 | 10 | — | — | 100 | 25 | Inv. |
| 27 | CAP | 1.3 | 1 | 2.3 | MA | 100 | — | — | 600 | 15 | — | — | 120 | 50 | Inv. |
| 28 | CAP | 1.1 | 1.35 | 2.45 | MMA | 80 | HEMA | 20 | 6000 | 20 | — | — | 60 | 4 | Inv. |
| 29 | CAP | 1.1 | 1.35 | 2.45 | MMA | 80 | HEMA | 20 | 6000 | 25 | — | — | 40 | 2 | Inv. |
| 30 | TAC | 2.87 | 0 | 2.87 | MMA | 80 | HEMA | 20 | 6000 | 25 | — | — | 3 | 0 | Comp. |
| 31 | CAP | 1.1 | 1.35 | 2.45 | MMA | 80 | HEMA | 20 | 6000 | 10 | *5 | 5 | 121 | 51 | Inv. |

*1: Cellulose acylate film No., Inv.: Inventive, Comp.: Comparative
*2: Triphenylphosphate(TPP)/Ethylphthalylethyl glycolate(EPEG)
*3: Retardation control agent 1
*4: Maruka Lyncur CST50 (Maruzen Petrochemical Co., Ltd.)
** Added amount (weight part)

(Preparation of Polarizing Plate)

Polarizing plates 1-31 were prepared using cellulose acylate films 1-31.

<Preparation of Polarizing Plates>

A 120 μm thick polyvinyl alcohol film was immersed into 100 kg of an aqueous solution incorporating 1 kg of iodine and 4 kg of boric acid, and then stretched at a factor of 6 to obtain a polarizer film. Each of above cellulose acylate films 1-31 which had been subjected to alkali saponification was adhered on one surface of the resulting polarizer film, employing, as an adhesive, a 5% aqueous solution of completely saponified type polyvinyl alcohol.

On the other surface of the polarizer film, Konicaminolta TAC, KC8UX (produced by Konicaminolta Opto, Inc.) was adhered.

<Alkali Saponification Treatment>

| Saponification Process | 2N—NaOH | 50° C. 90 seconds |
| Washing Process | water | 30° C. 45 seconds |
| Neutralization Process | 10 weight % HCl | 30° C. 45 seconds |
| Washing Process | water | 30° C. 45 seconds |

Under the above conditions, a film sample was saponified, washed, neutralized, and washed in the cited order, and subsequently dried at 80° C.

<<Evaluation>>
(Evaluation of Viewing Angle)

The originally provided polarizing plate of 30 in. sized vertical alignment mode liquid crystal display KDL-32S1000 produced by Sony Corp. was removed and each of the above prepared inventive or comparative polarizing plates was adhered onto the liquid crystal cell of the liquid crystal display using a commercially available acrylic adhesive, according to the following constitutions A or B. In the fabrication of the liquid crystal display, each polarizing plate was adhered so that the cellulose acylate film of the present invention was provided facing the liquid crystal cell and the absorption axis of each polarizing plate lay in the same direction as the absorption axis of the originally provided polarizing plate. Evaluation was carried out by observing the image from an upper and oblique direction.

In construction A, two pieces of each of polarizing plates 1-12, 14, 15, 17-23, 27 and 31 were adhered on both surfaces of a liquid crystal cell to form a pair.

In construction B, as the polarizing plate used in the viewer's side, Konicaminolta TAC KC8UX (produced by Konicaminolta Optp, inc.) was used and as the polarizing plate used in the backlight side, each of above prepared polarizing plate 13 and 16 was used to be adhered onto the liquid crystal cell, wherein each of above prepared cellulose acylate films 13 and 16 was adhered on the liquid crystal cell side of the polarizing plate. Evaluation criteria for constructions A and B are as follows:

A: The image is clearly observed
B: The image is difficult to recognize

As for construction C, the originally provided polarizing plate of liquid crystal display L17F4F1 produced by NEC-Mitsubishi Electric Visual Systems Co., Ltd. was removed and each of the above prepared inventive or comparative polarizing plates was adhered onto the liquid crystal cell of the liquid crystal display. In the fabrication of the liquid crystal display, each polarizing plate was adhered so that the cellulose acylate film of the present invention was provided facing to the glass plate of the liquid crystal cell and the absorption axis of each polarizing plate lay in the same direction as the absorption axis of the originally provided polarizing plate. Evaluation was carried out by observing the image from a horizontal and oblique direction to examine whether the image was recognized or not. Evaluation criteria for construction C are as follows:

A: The image is clearly recognized
B: The image is recognized
C: The image is difficult to recognize (Fabrication of Polarizing Plate)

After each cellulose acylate film was saponified and adhered onto the polarizer film made from polyvinyl alcohol, the adhered and dried film was tested whether the polarizing plate could be peeled by hand or not.

A: The films are adhered and cannot be peeled by hand
B: The films can be peeled by hand (Corner Unevenness (Also Referred to as "Corner Mura"))

After each fabricated liquid crystal display was kept at 65° C. under an ambient humidity condition for 500 hours, each liquid crystal display was turned on, and, after 6 hours, leakage of light at the corners while black was displayed (corner unevenness) was examined.

A: No leakage of light is observed at the corners
B: Leakage of light is observed
C: Notable leakage of light is observed at the corners (Clouding Unevenness (Also Referred to as "Clouding Mura"))

After each fabricated liquid crystal display was kept at 60° C. under 90% RH for 1000 hours, each liquid crystal display was turned on, and, after 6 hours, leakage of light in the whole screen while black was displayed was examined.

A: No cloudy leakage of light is observed
B: Cloudy leakage of light is observed, but negligible
C: Cloudy leakage of light is observed The results were shown in Table 3.

TABLE 3

| Polarizing Plate No. | *1 | *2 | Viewing angle | Fabrication of polarizing plate | Corner unevenness | Clouding unevenness | Remarks |
|---|---|---|---|---|---|---|---|
| 1 | 1 | A | A | A | A | A | Inv. |
| 2 | 2 | A | A | A | A | A | Inv. |
| 3 | 3 | A | A | A | A | A | Inv. |
| 4 | 4 | A | A | A | A | B | Inv. |
| 5 | 5 | A | A | A | A | A | Inv. |
| 6 | 6 | A | A | A | A | A | Inv. |
| 7 | 7 | A | A | A | A | B | Inv. |
| 8 | 8 | A | A | A | A | A | Inv. |
| 9 | 9 | A | A | A | A | A | Inv. |
| 10 | 10 | A | A | A | A | A | Inv. |
| 11 | 11 | A | A | A | A | A | Inv. |
| 12 | 12 | A | A | A | A | A | Inv. |
| 13 | 13 | B | A | A | A | A | Inv. |
| 14 | 14 | A | A | B | — | — | Comp. |
| 15 | 15 | A | A | B | — | — | Comp. |
| 16 | 16 | B | A | A | C | C | Comp. |
| 17 | 17 | A | A | A | C | C | Comp. |
| 18 | 18 | A | A | A | C | C | Comp. |
| 19 | 19 | A | A | A | B | C | Comp. |
| 20 | 20 | A | B | A | C | A | Comp. |
| 21 | 21 | A | A | A | B | C | Comp. |

TABLE 3-continued

| Polarizing Plate No. | *1 | *2 | Viewing angle | Fabrication of polarizing plate | Corner unevenness | Clouding unevenness | Remarks |
|---|---|---|---|---|---|---|---|
| 22 | 22 | A | B | A | B | C | Comp. |
| 23 | 23 | A | A | A | C | A | Comp. |
| 24 | 24 | B | A | A | A | B | Inv. |
| 25 | 25 | B | A | A | A | B | Inv. |
| 26 | 26 | C | A | A | A | A | Inv. |
| 27 | 27 | A | A | A | A | A | Inv. |
| 28 | 28 | C | B | A | A | A | Inv. |
| 29 | 29 | C | B | A | A | A | Inv. |
| 30 | 30 | C | C | A | A | A | Comp. |
| 31 | 31 | A | A | A | A | A | Inv. |

*1: Cellulose acylate film No.
*2: Construction of polarizing plate
Inv.: Inventive,
Comp.: Comparative It is clear that cellulose acylate films 1-13/polarizing plates 1-13 of the embodiments of the present invention exhibited totally excellent properties with respect to the viewing angle, fabrication of polarizing plate, corner unevenness and clouding unevenness.

Cellulose acylate film 13/polarizing plate 13 exhibiting a higher Rth value was found to show an excellent viewing angle property even when construction B was adopted.

Example 2

On the surface of each of cellulose acylate films 1-13 used for forming polarizing plates 1-13 prepared in Example 1, the following antistatic layer and an adhesive layer were formed.

Subsequently, the separate film provided on the adhesive layer was removed and the surface on which the above antistatic layer and the adhesive layer were formed was adhered on the liquid crystal cell of 30 in. sized vertical alignment mode liquid crystal display KDL-32S1000 produced by Sony Corp., instead of the originally provided polarizing plate.

As the result, it was found that, when the polarizing plate of the present invention was used, defect due to dust which generated while the films were adhered was reduced, crack and generation of cutting dust while the film was punched were reduced, and disturbance of orientation of liquid crystals was avoided, whereby the productivity of liquid crystal panel fabrication was improved.

<Formation of Antistatic Layer>

| | |
|---|---|
| Cationic polmer represented by Formula (3), exemplified compound IP-24 | 0.5 weight part |
| Acetone solution of 5% cellulose diacetate | 10 weight parts |
| Methylethyl ketone | 35 weight parts |
| Propylene glycol monomethylether | 50 weight parts |

After the solvents, namely, methylethyl ketone and propylene glycol monomethylether, were mixed and stirred until the mixture became homogeneous, diacetyl cellulose was dissolved little by little, while stirring. After the diacetyl cellulose was completely dissolved, the cationic polymer dispersed in methanol was dripped little by little. After the drip of the cationic polymer was completed, the liquid was further stirred for 2-3 hours to form a coating composition of the antistatic layer.

Above described coating composition was applied on one surface of the above prepared cellulose acylate film in a dry thickness of 0.2 µm using a die coater and dried at 100° C. for 24 hours to form a layer containing a cationic polymer.

The surface resistivity of the coated film was in the range of $2\times10^8 \Omega$-$2\times10^9 \Omega$ and exhibited a sufficient antistatic property.

<Formation of Adhesive Layer>

A solution (24% of solid content) which contains an acrylic polymer of the weight average molecular weight of 1,800,000 which is a copolymer of butyl acrylate:acrylic acid: 2-hydroxyethyl acrylate=100:5:0.1 (in mass ratio) as a base polymer was used. To 100 weight parts of the solid content of the polymer, there added were 2.5 weight parts of Coronate L produced by Nippon Polyurethane Industry Co., Ltd., which is a isocyanate polyfunctional compound, 0.6 weight part of an additive (KBM-403, produced by Shin-Etsu Silicones Co., Ltd.) and a solvent (ethyl acetate) for adjusting the viscosity to form an adhesive solution (solid content of 11%). The adhesive solution was applied on the antistatic layer via a reverse roll coating method so as to have a dry thickness of 25 µm, a separate film (polyethylene-terephthalate based film: diafoil MRF38, produced by Mitsubishi Polyester Film) was provided on it, and then the film was dried in an oven in which heated air was circulated. Thus an adhesive layer was formed and the agglutinate layer was formed.

The storage elastic modulus at 25° C. of the adhesive layer was $4.4\times10^6$ Pa as a result of the following measurement.

<Measuring Method of Storage Elastic Modulus of Adhesive Layer>

The adhesive layer coating composition was applied on a polyethylene terephthalate film base support. The film was exfoliated and the storage elastic modulus at 25° C. was measured with a dynamic viscoelasticity measuring device (ARES, produced by Rheometric Scientific) in the temperature-raising mode (heating-rate of 5° C./min. at the frequency of 10 Hz).

What is claimed is:

1. A polarizer protective film comprising:
   a cellulose acylate having a total acyl substitution degree of from 2.2 to less than 2.5; and
   a polymer represented by Formula (1),
   wherein an in-plane retardation value of the film Ro is 0 to 100 nm and a retardation value in a thickness direction of the film Rth is 40 to 250 nm, $Ro = (nx - ny) \times d$ $Rth = \{(nx + ny)/2 - nz\} \times d$ wherein, nz is a refractive index in a slow axis direction in a film plane, ny is a refractive index in a fast axis direction in the film plane, nz is a refractive index in a thickness direction of the film and d is a thickness of the film (nm), $$-[CH_2-C(-R_1)(-CO_2R_2)]_m-[CH_2(-CR_3)(-CO_2R_4-OH)-]_n \qquad \text{Formula (1)}$$

where $R_1$ and $R_3$ each represent H or $CH_3$, $R_2$ represents an alkyl group having 2-12 carbon atoms or a cycloalkyl group, $R_4$ represents $-CH_2-$, $-C_2H_4-$, or $-C_3H_6-$, m and n each represent a molar ratio, and m+n=100.

2. The polarizer protective film of claim 1, wherein
a weight average molecular weight of the polymer represented by Formula (1) is 500 to 30000.

3. The polarizer protective film of claim 1, wherein the polymer is a polymer obtained by copolymerizing monomer Xa which is an ethylenically unsaturated monomer having neither an aromatic ring nor a hydrophilic group in the molecule, and monomer Xb which is an ethylenically unsaturated monomer having no aromatic ring and having a hydrophilic group in the molecule.

4. The polarizer protective film of claim 1, wherein the in-plane retardation value is 50 to 100 nm.

5. The polarizer protective film of claim 1, wherein the retardation value in the thickness direction Rth is 60 to 250 nm.

6. The polarizer protective film of claim 5, wherein the retardation value in the thickness direction Rth is 100 to 250 nm.

7. The polarizer protective film of claim 1,
wherein the in-plane retardation value is 25 to 100 nm.

8. The polarizer protective film of claim 1,
wherein the molar ratio of m and n is 99:1 to 65:35.

* * * * *